(12) United States Patent
Iwamoto

(10) Patent No.: US 10,140,076 B2
(45) Date of Patent: Nov. 27, 2018

(54) INFORMATION PROCESSING APPARATUS AND NON-TRANSITORY RECORDING MEDIUM

(71) Applicant: Konica Minolta, Inc., Tokyo (JP)

(72) Inventor: Shohei Iwamoto, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/477,697

(22) Filed: Apr. 3, 2017

(65) Prior Publication Data

US 2017/0293455 A1 Oct. 12, 2017

(30) Foreign Application Priority Data

Apr. 12, 2016 (JP) .................................. 2016-079437

(51) Int. Cl.
| | | |
|---|---|---|
| G06F 3/12 | (2006.01) | |
| G06K 15/02 | (2006.01) | |
| G06F 3/14 | (2006.01) | |
| G06F 3/147 | (2006.01) | |

(52) U.S. Cl.
CPC .......... *G06F 3/1293* (2013.01); *G06F 3/1205* (2013.01); *G06F 3/1248* (2013.01); *G06F 3/1254* (2013.01); *G06F 3/1257* (2013.01); *G06F 3/1259* (2013.01); *G06F 3/1276* (2013.01); *G06F 3/1292* (2013.01); *G06F 3/147* (2013.01); *G06F 3/1454* (2013.01); *G09G 2354/00* (2013.01)

(58) Field of Classification Search
None
See application file for complete search history.

(56) References Cited

U.S. PATENT DOCUMENTS

| | | | | |
|---|---|---|---|---|
| 5,165,014 A | * | 11/1992 | Vassar ................... | G06F 17/275 358/1.13 |
| 2010/0225959 A1 | * | 9/2010 | Selvaraj ................ | G06F 3/1204 358/1.15 |
| 2013/0271780 A1 | * | 10/2013 | Sugiyama ............. | G06F 3/1297 358/1.13 |

(Continued)

FOREIGN PATENT DOCUMENTS

JP 2015-176354 A 10/2015

*Primary Examiner* — Beniyam Menberu
(74) *Attorney, Agent, or Firm* — Osha Liang LLP

(57) ABSTRACT

An information processing apparatus includes a communication part that communicates with a first image processing apparatus to execute a job set based on a first command set and a second image processing apparatus to execute a job set based on a second command set; a display controller displaying a setting screen; a setting command extracting part that extracts at least one setting command from setting commands; a command transmitting part that transmits the setting command to the first image processing apparatus or the second image processing apparatus; a setting command registering part that registers the setting command with command registration information; a command determining part determining whether or not the second command set includes a setting command associated with the setting command in the first command set; and a setting command reflecting part that reflects the setting command in the setting screen.

16 Claims, 17 Drawing Sheets

(56) References Cited

U.S. PATENT DOCUMENTS

2014/0351721 A1* 11/2014 DeLuca ............ G06F 17/30905
                                                715/760
2015/0002891 A1* 1/2015 Kadota ................ G06F 3/1292
                                                358/1.15
2015/0261480 A1* 9/2015 Omura .................. G06F 3/1231
                                                358/1.13

* cited by examiner

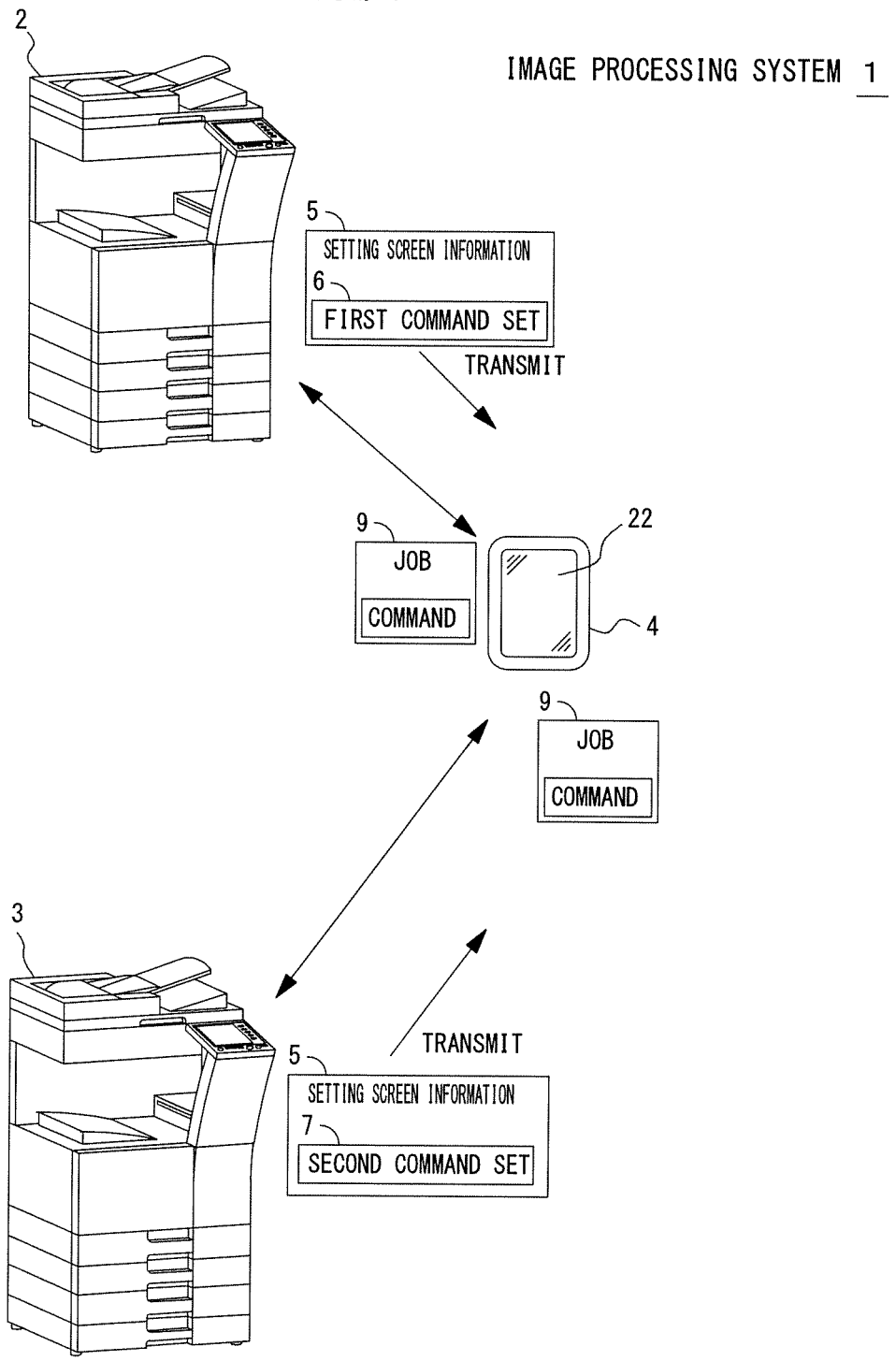

FIRST COMMAND SET  6

SECOND COMMAND SET  7

FIG. 3

COMMAND TABLE  12

| COMMAND ||  KEYWORD |
| FIRST IMAGE PROCESSING APPARATUS | SECOND IMAGE PROCESSING APPARATUS | |
| --- | --- | --- |
| gray | monochro | key_mono |
| color | fullcolor | key_color |
| side_single | side_one | key_side1 |
| side_both | side_two | key_side2 |
| punch_two | punching | key_punch |
| — | staple | key_staple |

FIG. 10

COMMAND REGISTRATION INFORMATION 10

| COMMAND | KEYWORD |
|---|---|
| gray | key_mono |
| side_both | key_side2 |
| punch_two | key_punch |

FIG. 11 (A)

FIRST COMMAND SET  6

| COMMAND | KEYWORD |
|---|---|
| gray | key_mono |
| color | key_color |
| side_single | key_side1 |
| side_both | key_side2 |
| punch_two | key_punch |

SECOND COMMAND SET  7

| COMMAND | KEYWORD |
|---|---|
| monochro | key_mono |
| fullcolor | key_color |
| side_one | key_side1 |
| side_two | key_side2 |
| punching | key_punch |
| staple | key_staple |

7a, 7b

INFORMATION PROCESSING APPARATUS AND NON-TRANSITORY RECORDING MEDIUM

The present U.S. patent application claims a priority under the Paris Convention of Japanese patent application No. 2016-079437 filed on Apr. 12, 2016, the entirety of which is incorporated herein by references.

BACKGROUND

Technical Field

One or more embodiments of the present invention relate to an information processing apparatus and a non-transitory recording medium. One or more embodiments of the present invention relate to a technique to be employed by the information processing apparatus to remotely control an image processing apparatus by communicating with the image processing apparatus.

Description of the Background Art

There is a conventional information processing apparatus such as a personal computer (PC) provided as an apparatus to make an output setting for an image processing apparatus such as a printer by being connected to the image processing apparatus. By registering an output setting in advance for the image processing apparatus intended by a user, the information processing apparatus is allowed to easily make the image processing apparatus produce an output reflecting the registered output setting. The information processing apparatus is connectable to one or a plurality of image processing apparatuses through a network, etc. The user is allowed to select an intended one of a plurality of image processing apparatuses and make the selected image processing apparatus produce an output.

Meanwhile, an intended setting registered in connection with one image processing apparatus cannot be applied to a different image processing apparatus. This requires the user to input the intended setting to each image processing apparatus. There is a conventional technique suggested for an information processing apparatus including a plurality of printer drivers to operate in a manner that depends on their environments of execution. This technique is to reflect a favorite registered in connection with one printer driver in a different printer driver (disclosed in Japanese Patent Application Laid-Open No. 2015-176354, for example).

According to the prior art disclosed in Japanese Patent Application Laid-Open No. 2015-176354, however, all the printer drivers are to control output from the same printer. Hence, even with the use of this prior-art technique, a registered favorite including an intended setting for one image processing apparatus cannot be reflected in a setting for a different image processing apparatus.

SUMMARY

One or more embodiments of the present invention provide an information processing apparatus connectable to an image processing apparatus and capable of reflecting a registered favorite including an intended setting registered in connection with one image processing apparatus in a different image processing apparatus, and a program allowing such reflection.

First, one or more embodiments of the present invention are directed to an information processing apparatus.

According to an aspect, the information processing apparatus comprises: a communication part that communicates with at least one of a first image processing apparatus to execute a job set based on a first command set and a second image processing apparatus to execute a job set based on a second command set different from the first command set; a command set acquiring part, while the communication part communicates with the first image processing apparatus, the command set acquiring part acquiring the first command set from the first image processing apparatus through the communication part, while the communication part communicates with the second image processing apparatus, the command set acquiring part acquiring the second command set from the second image processing apparatus through the communication part; a display controller, if the command set acquiring part acquires the first command set or the second command set, the display controller displaying a setting screen in which a user is allowed to set at least one of a plurality of setting commands in the first command set or the second command set; a setting command extracting part that extracts at least one setting command from the setting commands in the first command set or the second command set based on setting operation by the user while the display controller displays the setting screen; a command transmitting part that transmits the setting command extracted by the setting command extracting part to the first image processing apparatus or the second image processing apparatus; a setting command registering part that registers the setting command extracted by the setting command extracting part with command registration information; a command determining part, if a setting command in the first command set is registered with the command registration information and the command set acquiring part acquires the second command set, the command determining part determining whether or not the second command set includes a setting command associated with the setting command in the first command set registered with the command registration information; and a setting command reflecting part that extracts a setting command associated with the setting command in the first command set registered with the command registration information from the setting commands in the second command set based on a result of the determination by the command determining part, and reflects the extracted setting command in the setting screen.

Second, one or more embodiments of the present invention are directed to a non-transitory recording medium storing a computer readable program to be executed by an information processing apparatus comprising a communication part that communicates with at least one of a first image processing apparatus to execute a job set based on a first command set and a second image processing apparatus to execute a job set based on a second command set different from the first command set.

According to an aspect, the non-transitory recording medium stores the computer readable program causing the information processing apparatus to function as: a command set acquiring part, while the communication part communicates with the first image processing apparatus, the command set acquiring part acquiring the first command set from the first image processing apparatus through the communication part, while the communication part communicates with the second image processing apparatus, the command set acquiring part acquiring the second command set from the second image processing apparatus through the communication part; a display controller, if the command set acquiring part acquires the first command set or the second command set, the display controller displaying a setting screen in which a user is allowed to set at least one of a plurality of setting commands in the first command set or the second command set; a setting command extracting part that extracts at least one setting command from the setting commands in the first command set or the second command set based on setting operation by the user while the display controller displays the setting screen; a command transmitting part that transmits the setting command extracted by the setting command extracting part to the first image processing apparatus or the second image processing apparatus; a setting command registering part that registers the setting command extracted by the setting command extracting part with command registration information; a command determining part, if a setting command in the first command set is registered with the command registration information and the command set acquiring part acquires the second command set, the command determining part determining whether or not the second command set includes a setting command associated with the setting command in the first command set registered with the command registration information; and a setting command reflecting part that extracts a setting command associated with the setting command in the first command set registered with the command registration information from the setting commands in the second command set based on a result of the determination by the command determining part, and reflects the extracted setting command in the setting screen.

BRIEF DESCRIPTION OF THE DRAWINGS

The advantages and features of one or more embodiments of the present invention will become more fully understood from the detailed description given hereinbelow and the appended drawings which are given by way of illustration only, and thus are not intended as a definition of the limits of the present invention, and wherein:

FIG. 1 shows an example of the configuration of an image processing system including an information processing apparatus;

FIG. 3 shows an example of the configuration of a command table;

FIG. 10 shows an example of the configuration of command registration information;

FIGS. 11(A) and 11(B) show an example of a command set with added keywords acquired from the first image processing apparatus and an example of a command set with added keywords acquired from the second image processing apparatus respectively;

DETAILED DESCRIPTION

Figure 2A:
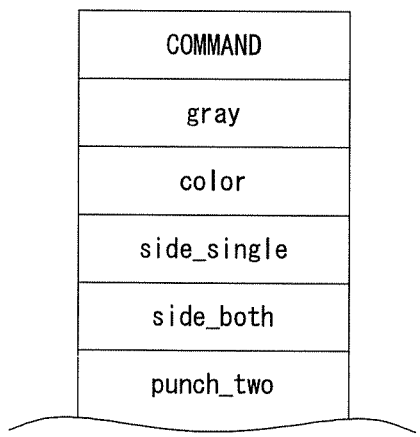
FIGS. 2(A) and 2(B) each show an example of the configuration of a command set acquired from an image processing apparatus.

Hereinafter, embodiments of the present invention will be described with reference to the drawings. However, the scope of the invention is not limited to the illustrated examples.

FIG. 1 shows an example of the configuration of an image processing system 1 according to one or more embodiments of the present invention. The image processing system 1 includes a plurality of image processing apparatuses including an image processing apparatus 2 and an image processing apparatus 3, and an information processing apparatus 4. Each of the image processing apparatuses 2 and 3 is formed of a multifunctional peripheral (MFP), for example, and is capable of executing a job such as a print job or a scan job designated by a user. As illustrated in FIG. 1, in this example, two image processing apparatuses 2 and 3 including a first image processing apparatus 2 and a second image processing apparatus 3 are prepared. However, the number of the image processing apparatuses 2 and 3 is not limited to two but it can be three or more.

The information processing apparatus 4 is formed of a communication terminal such as a tablet terminal or a smartphone, or a general personal computer (PC), for example. The information processing apparatus 4 can be carried by a user. The information processing apparatus 4 has a communication function and is connectable in a wired or wireless manner to a network such as a local area network (LAN) to which each of the image processing apparatuses 2 and 3 is connected. The information processing apparatus 4 is allowed to communicate with at least one of the image processing apparatuses 2 and 3 through the network.

If the first image processing apparatus 2 and the second image processing apparatus 3 are connected to different networks, for example, the information processing apparatus 4 is brought to a state allowing communication with the first image processing apparatus 2 by being connected to the network to which the first image processing apparatus 2 is connected. The information processing apparatus 4 is brought to a state allowing communication with the second image processing apparatus 3 by being connected to the network to which the second image processing apparatus 3 is connected. If the first image processing apparatus 2 and the second image processing apparatus 3 are connected to the same network, the information processing apparatus 4 is brought to a stage allowing communication with at least one of the first image processing apparatus 2 and the second image processing apparatus 3 by being connected to this network.

The information processing apparatus 4 includes a dedicated application installed in advance for allowing communication with each of the image processing apparatuses 2 and 3. By starting this application, the information processing apparatus 4 searches for the image processing apparatus 2 or 3 connected to a network to which the information processing apparatus 4 is currently connected. If the first image processing apparatus 2 and the second image processing apparatus 3 are found by the search, the application displays a screen for selecting the image processing apparatus 2 or 3 as a destination of output of a job and makes a user select one image processing apparatus. Then, the application determines the image processing apparatus selected by the user to be a communication counterpart and then starts communication with this image processing apparatus. Meanwhile, if only one of the first image processing apparatus 2 and the second image processing apparatus 3 is found by the search, the application determines the image processing apparatus found by the search to be a communication counterpart and then starts communication with this image processing apparatus.

After starting communication with the determined image processing apparatus, the application on the information processing apparatus 4 acquires setting screen information 5 allowing job setting operation by the user and displays a setting screen generated based on the acquired setting screen information on a display part 22. The setting screen information 5 includes a command set applicable to the determined image processing apparatus. The command set includes a plurality of setting commands for reflecting set values set by the user in corresponding setting items settable at the determined image processing apparatus. Specifically, the command set includes setting commands corresponding to all set values settable by the user on a setting screen displayed on the display part 22. The application accepts operation to set a job by the user. If the user gives an order to execute the job thereafter, the application transmits the job such as a print job to the determined image processing apparatus. At this time, the application extracts a setting command corresponding to the setting operation by the user from the command set acquired from the determined image processing apparatus, adds the extracted setting command to the job, and then transmits the job. In this way, the determined image processing apparatus is allowed to execute the job based on the setting command added to the job. The application is capable of registering the setting command added to the job as a favorite of the user, in response to an order from the user.

The aforementioned application is intended only to display a setting screen on the display part 22 generated based on the setting screen information 5 acquired from the determined image processing apparatus. This application does not know a setting item included in the setting screen and does not know a set value set about a corresponding setting item by the user. Specifically, this application functions to extract a setting command associated in advance with a set value (merely a display content) displayed in a corresponding setting item on the setting screen. In other cases, if setting operation by the user is detected and if a setting command is defined in a region where the operation is detected, the application functions to extract this setting command. Thus, for registration of a favorite of the user, the application is not capable of registering a set value about a corresponding setting item but it functions to register a setting command added to a job.

If the first image processing apparatus 2 and the second image processing apparatus 3 are of different types, a first command set 6 applicable to the first image processing apparatus 2 and a second command set 7 applicable to the second image processing apparatus 3 may have different command systems. Specifically, as shown in FIG. 1, the first command set 6 the application acquires from the first image processing apparatus 2 and the second command set 7 the application acquires from the second image processing apparatus 3 may have different command systems and these command sets may include setting commands not common to each other. Hence, even if the application registers a setting command extracted from the first command set 6 as a favorite of the user, the application is not capable of making the second image processing apparatus 3 execute a job by transmitting the setting command in this registered favorite to the second image processing apparatus 3.

In one or more embodiments, the application installed on the information processing apparatus 4 is configured in such a manner that, while a setting command extracted from the first command set 6 is registered as a favorite of a user, the application converts the setting command in this registered favorite to a setting command in the second command set 7, thereby allowing the image processing apparatuses 2 and 3 of different command systems to share a registered favorite.

Figure 2B:
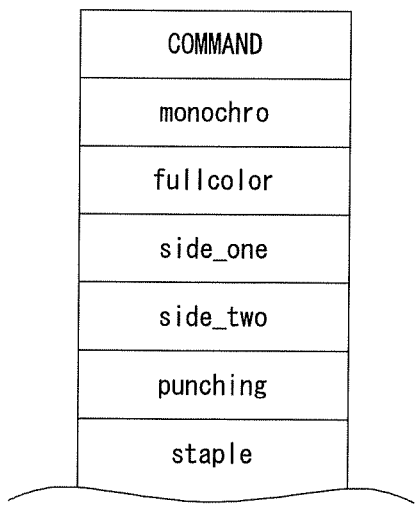

FIGS. 2(A) and 2(B) show examples of the configurations of the first command set 6 and the second command set 7 respectively. FIG. 2(A) shows an example of the configuration of the first command set 6 transmitted from the first image processing apparatus 2 to the information processing apparatus 4. The first command set 6 includes a command prepared for a corresponding setting for a function of the first image processing apparatus 2. The first command set 6 includes the following commands about a color setting: a command "gray" for making a black and white setting; and a command "color" for making a setting in colors. The first command set 6 includes the following commands about a printing side: a command "side_single" for making a single-side setting; and a command "side_both" for making a double-side setting. The first command set 6 includes a command "punch_two" for making a setting to form a hole in a predetermined place of a printing sheet.

FIG. 2(B) shows an example of the configuration of the second command set 7 transmitted from the second image processing apparatus 3 to the information processing apparatus 4. The second command set 7 includes a command prepared for a corresponding setting for a function of the second image processing apparatus 3. The second command set 7 includes the following commands about a color setting: a command "monochro" for making a black and white setting; and a command "fullcolor" for making a setting in colors. The second command set 7 includes the following commands about a printing side: a command "side_one" for making a single-side setting; and a command "side_two" for making a double-side setting. The second command set 7 includes a command "punching" for making a setting to form a hole in a predetermined place of a printing sheet, and a command "staple" for making a setting to staple printing sheets at a predetermined place. With the first image processing apparatus 2 and the second image processing apparatus 3 of different types, a command for making the first image processing apparatus 2 produce a designated output and a command for making the second image processing apparatus 3 produce a designated output differ each other in many cases, even through these commands are intended to produce the same output. In the examples of FIGS. 2(A) and 2(B), the first image processing apparatus 2 and the second image processing apparatus 3 are to perform black and white printing in response to different commands as follows: a command for the first image processing apparatus 2 is described as "gray," whereas a command for the second image processing apparatus 3 is described as "monochro."

The information processing apparatus 4 is capable of registering a setting command for the first image processing apparatus 2 as a favorite while the information processing apparatus 4 is connected to the first image processing apparatus 2. Registering a favorite is to register a command extracted in response to setting operation by a user from a plurality of commands in the first command set 6 received from the first image processing apparatus 2. The command registered as the favorite is stored as command registration information 10 into the information processing apparatus 4.

If the information processing apparatus 4 is connected to the second image processing apparatus 3 while a favorite registered in connection with the first image processing apparatus 2 is registered with the information processing apparatus 4, the favorite registered in connection with the first image processing apparatus 2 can be reflected in the second image processing apparatus 3. To register a favorite in connection with the first image processing apparatus 2, the information processing apparatus 4 registers a command for making the first image processing apparatus 2 produce a designated output with the command registration information 10. To register a favorite in connection with the second image processing apparatus 3, the information processing apparatus 4 registers a command for making the second image processing apparatus 3 produce the designated output with the command registration information 10. As described above, in many cases, a command for making the first image processing apparatus 2 produce the designated output and a command for making the second image processing apparatus 3 produce the designated output differ each other. Then, to reflect the favorite registered in connection with the first image processing apparatus 2 in an output setting for the second image processing apparatus 3, the information processing apparatus 4 includes a command table 12 in which a command in the first command set 6 and a command in the second command set 7 are associated with each other. In this way, commands for producing the same output are associated with each other. To reflect the favorite registered in connection with the first image processing apparatus 2 in the second image processing apparatus 3, the information processing apparatus 4 refers to the command table 12, extracts a command from the second command set 7 associated with a command in the command registration information 10 registered based on a command in the first command set 6, and reflects the extracted command in an output setting for the second image processing apparatus 3. By doing so, the favorite registered in connection with the first image processing apparatus 2 can be reflected in an output setting for the second image processing apparatus 3.

FIG. 3 shows an example of the configuration of the command table 12. The command table 12 may be stored in advance in the information processing apparatus 4. Alternatively, when the information processing apparatus 4 is connected to the first image processing apparatus 2 or the second image processing apparatus 3, the command table 12 may be transmitted together with a command set to the information processing apparatus 4 and acquired by the information processing apparatus 4. The command table 12 has a command associating section 12a where a command in the first command set 6 and a command in the second command set 7 are associated with each other, and a keyword 12b where a keyword is associated with each command associated in the command associating section 12a. A command in the first command set 6 and a command in the second command set 7 associated with each other in the command associating section 12a are commands for making the first image processing apparatus 2 and the second image processing apparatus 3 produce the same output. In the example of FIG. 3, the command "gray" in the first command set 6 and the command "monochro" in the second command set 7 both intended to produce an output with a black and white color setting, are associated with each other. If a favorite for making a black and white color setting is registered in connection with the first image processing apparatus 2, the command registration information 10 includes the command "gray" extracted from the first command set 6. To reflect this registered favorite in an output setting for the second image processing apparatus 3, the information processing apparatus 4 refers to the command table 12 and recognizes that the command "monochro" in the second command set 7 is associated with the command "gray." Then, the information processing apparatus 4 extracts the command "monochro" from the second command set 7 and reflects this registered favorite in an output setting for the second image processing apparatus 3. In the keyword 12b, a keyword is further associated with each command associated in the command associating section 12a. The information processing apparatus 4 determines whether or not a command in the second command set 7 and a command registered with the command registration information 10 match each other by comparing keywords associated with these commands. If these commands match each other, the information processing apparatus 4 extracts the command associated with the matching keyword from the second command set 7 and reflects the extracted command in an output setting.

Figure 4:
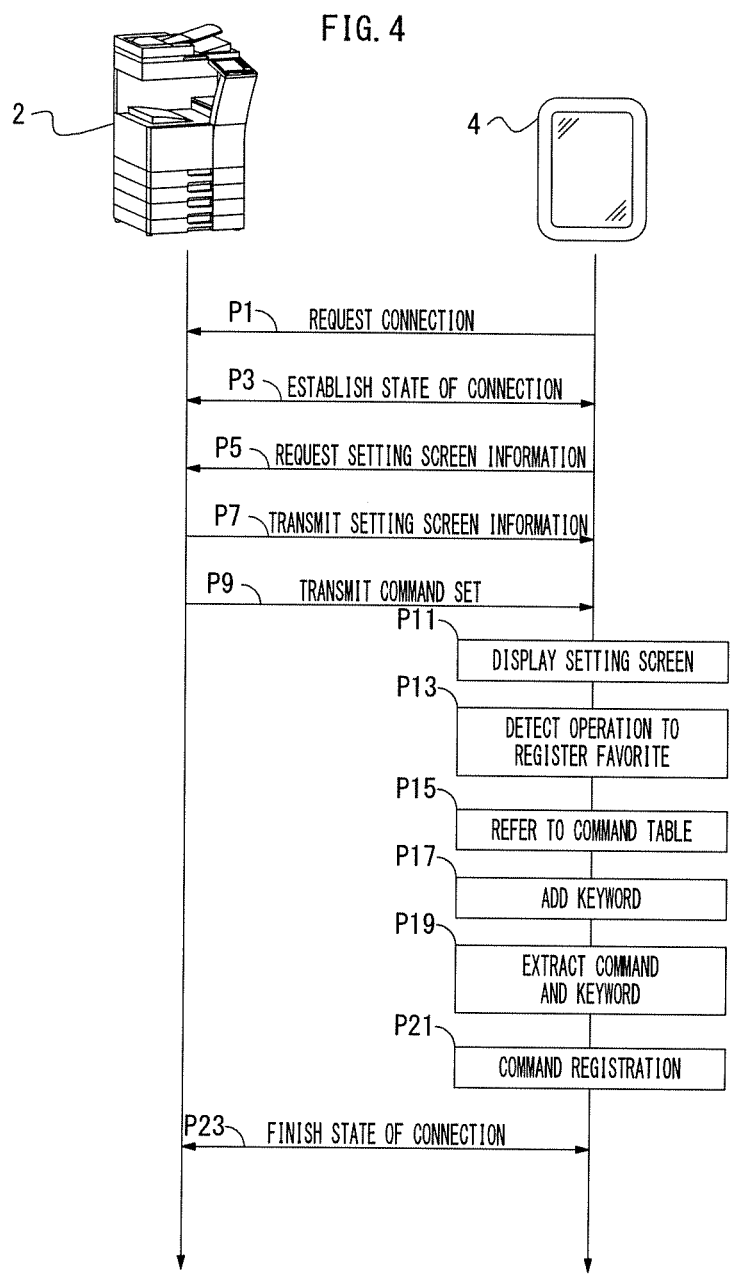
FIG. 4 is a timing chart showing an example of processing executed while a first image processing apparatus and the information processing apparatus are connected to each other.

The following description is about a flow of processing executed by the information processing apparatus 4 while the information processing apparatus 4 is connected to the first image processing apparatus 2 and the second image processing apparatus 3. FIG. 4 is a timing chart showing an example of communication between the information processing apparatus 4 and the first image processing apparatus 2. First, if the information processing apparatus 4 detects the first image processing apparatus 2, the information processing apparatus 4 transmits a connection request (process P1). If the first image processing apparatus 2 approves the connection request and a state of connection between the information processing apparatus 4 and the first image processing apparatus 2 is established (process P3), the information processing apparatus 4 requests setting screen information for accepting an output setting for the first image processing apparatus 2 (process P5). If the first image processing apparatus 2 receives the request for setting screen information, the first image processing apparatus 2 transmits setting screen information to the information processing apparatus 4 (process P7). Further, the first image processing apparatus 2 transmits the first command set 6 to the information processing apparatus 4 (process P9). If the information processing apparatus 4 receives the setting screen information, the information processing apparatus 4 displays a setting screen on the display part 22 based on the setting screen information (process P11). If the received setting screen information is print setting screen information, the information processing apparatus 4 displays a print setting screen G1 on the display part 22.

Then, if the information processing apparatus 4 detects operation by a user to register a favorite (process P13), the information processing apparatus 4 refers to the command table 12 stored in a storage 28 (process P15), and adds a keyword (see FIG. 10) to a command in the first command set 6 to be registered as a favorite (process P17). The process of adding a keyword to a command will be described later. Then, the information processing apparatus 4 extracts the command to be registered as a favorite and the added keyword (process P19), and registers the extracted command and the extracted keyword as the command registration information 10 (process P21). Finally, in response to operation performed at the information processing apparatus 4 to finish the state of communication with the first image processing apparatus 2 (process P23), the state of communication between the apparatuses is finished.

Figure 5:
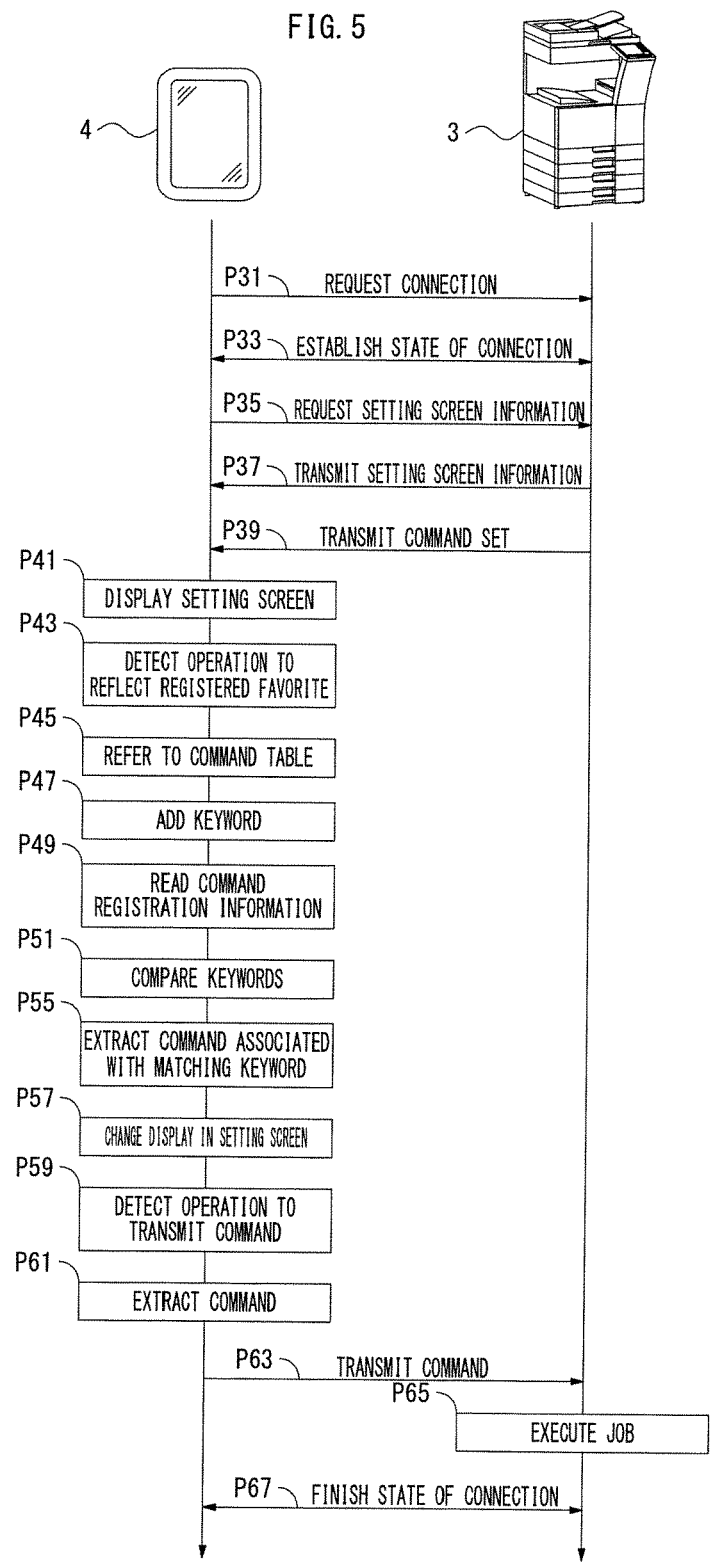
FIG. 5 is a timing chart showing an example of processing executed while a second image processing apparatus and the information processing apparatus are connected to each other.

FIG. 5 is a timing chart showing an example of communication between the information processing apparatus 4 and the second image processing apparatus 3. The information processing apparatus 4 shown in the example of FIG. 5 includes the command registration information 10 registered by registration of the favorite during making the print setting for the first image processing apparatus 2, as shown in FIG. 4. If the information processing apparatus 4 detects the second image processing apparatus 3, for example, the information processing apparatus 4 transmits a connection request to the second image processing apparatus 3 (process P31). If the second image processing apparatus 3 approves the connection request to establish a state of connection (process P33), the information processing apparatus 4 transmits a request for setting screen information to the second image processing apparatus 3 (process P35). If the second image processing apparatus 3 receives this request, the second image processing apparatus 3 transmits setting screen information to the information processing apparatus 4 (process P37). Further, the second image processing apparatus 3 transmits the second command set 7 (process P39). If the information processing apparatus 4 receives the setting screen information, the information processing apparatus 4 displays a setting screen on the display part 22 based on the setting screen information (process P41). If the setting screen information received from the second image processing apparatus 3 is print setting screen information, for example, the information processing apparatus 4 displays a print setting screen G10 on the display part 22.

Then, if the information processing apparatus 4 detects operation by the user to reflect the registered favorite (process P43), the information processing apparatus 4 refers to the command table 12 (process P45), and adds a keyword (see FIG. 11(B)) to each command in the second command set 7 acquired from the second image processing apparatus 3 (process P47). The process of adding a keyword to a command will be described later. Then, the information processing apparatus 4 reads the command registration information 10 from the storage 28 (process P49), and compares a keyword 101) in the command registration information 10 and a keyword 7b added to each command in the second command set 7 (process P51). If the keyword 10b and the keyword 7b match each other, the information processing apparatus 4 extracts a command 7a associated with the matching keyword 7b (process P55). Then, the information processing apparatus 4 changes a display of a setting screen in a manner that depends on the extracted command 7a (process P57). In this way, the user is notified of the fact that the registered favorite has been reflected in the second image processing apparatus 3. Changing a display of the setting screen in a manner that depends on the extracted command 7a will be described later.

If the information processing apparatus 4 detects operation to give an order to transmit a command to the second image processing apparatus 3 (process P59), the information processing apparatus 4 generates a job for the second image processing apparatus 3 and extracts a command defined in the setting screen from the second command set 7 (process P61). Then, the information processing apparatus 4 transmits the job and the extracted command to the second image processing apparatus 3 (process P63). If the job and the command are received from the information processing apparatus 4, the second image processing apparatus 3 executes the job (process P65). Finally, if the information processing apparatus 4 detects operation to order finish of the state of connection to the second image processing apparatus 3, for example, the state of connection between the information processing apparatus 4 and the second image processing apparatus 3 is finished (process P67).

Figure 6:
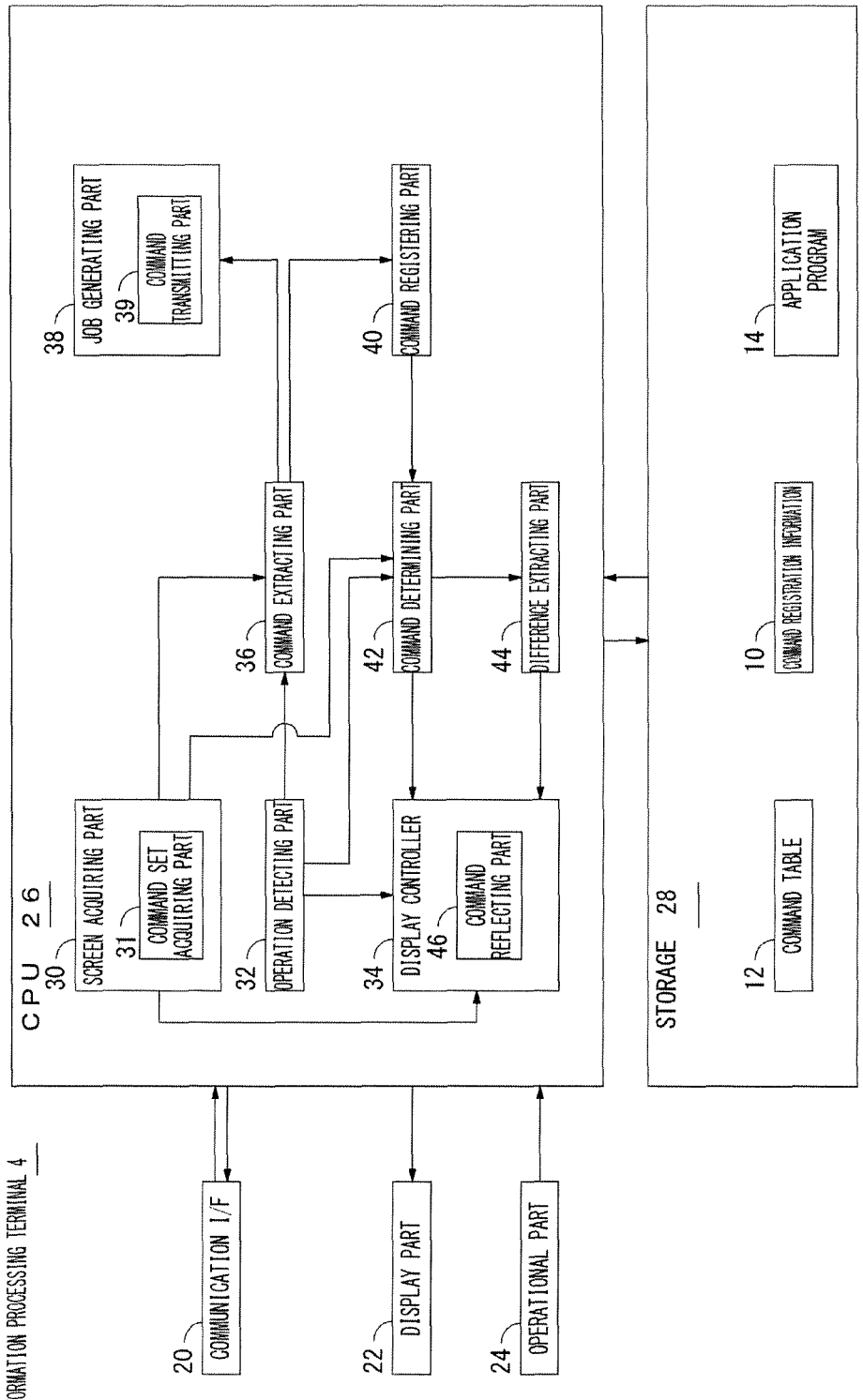
FIG. 6 is a block diagram showing an example of the hardware configuration and an example of the functional configuration of the information processing apparatus.

The configuration of the information processing apparatus 4 for executing the aforementioned processing will be described next. FIG. 6 is a block diagram showing an example of the hardware configuration and an example of the functional configuration of the information processing apparatus 4. The information processing apparatus 4 includes a communication interface 20 functioning as an interface of communication with an external device, the display part 22, an operational part 24 formed of an operational panel and a keyboard, etc., a CPU 26, and the storage 28.

The storage 28 is storage means such as a nonvolatile memory, for example, and stores the aforementioned command registration information 10 and the aforementioned command table 12. The storage 28 further stores an application program 14 for controlling output executed by the information processing apparatus 4.

The CPU 26 executes the application program 14 to function as a screen acquiring part 30 that acquires setting screen information from the first image processing apparatus 2 or the second image processing apparatus 3, an operation detecting part 32 that detects operational input to the operational part 24, and a display controller 34 that controls a display of a setting screen, etc. to be output to the display part 22. The screen acquiring part 30 further functions as a command set acquiring part 31 that acquires the first command set 6 from the first image processing apparatus 2 or the second command set 7 from the second image processing apparatus 3.

The CPU 26 functions as a command extracting part 36 that extracts a command in response to operational input from the first command set 6 or the second command set 7 acquired by the command set acquiring part 31, a job generating part 38 that generates a job to be transmitted to the first image processing apparatus 2 or the second image processing apparatus 3 together with the command extracted by the command extracting part 36, and a command registering part 40 that registers a favorite by registering the command extracted by the command extracting part 36 in response to the operational input with the command registration information 10. The CPU 26 functions as a command determining part 42 that determines whether or not a command in the second command set 7 acquired from the second image processing apparatus 3 and a command in the command registration information 10 match each other, and a difference extracting part 44 that extracts a difference between the command in the second command set 7 and the command in the command registration information 10 based on a result of the determination by the command determining part 42.

If a state of connection to the first image processing apparatus 2 or the second image processing apparatus 3 is established, the screen acquiring part 30 requests the first image processing apparatus 2 or the second image processing apparatus 3 in the state of connection to transmit setting screen information to be used for output setting operation. If the setting screen information is received from the first image processing apparatus 2 or the second image processing apparatus 3, the screen acquiring part 30 acquires the received setting screen information. If the first command set 6 is received from the first image processing apparatus 2, the command set acquiring part 31 acquires the received first command set 6. If the second command set 7 is received from the second image processing apparatus 3, the command set acquiring part 31 acquires the received second command set 7.

The display controller 34 is a processor that displays a setting screen on the display part 22 based on setting screen information acquired by the screen acquiring part 30. The display controller 34 becomes functional if the setting screen information received by the screen acquiring part 30 from the first image processing apparatus 2 or the second image processing apparatus 3 is acquired. If the command set acquiring part 31 acquires the first command set 6 or the second command set 7, the display controller 34 displays a setting screen on the display part 22 in which a user is allowed to set at least one of a plurality of commands in the first command set 6 or the second command set 7.

Figure 7A:
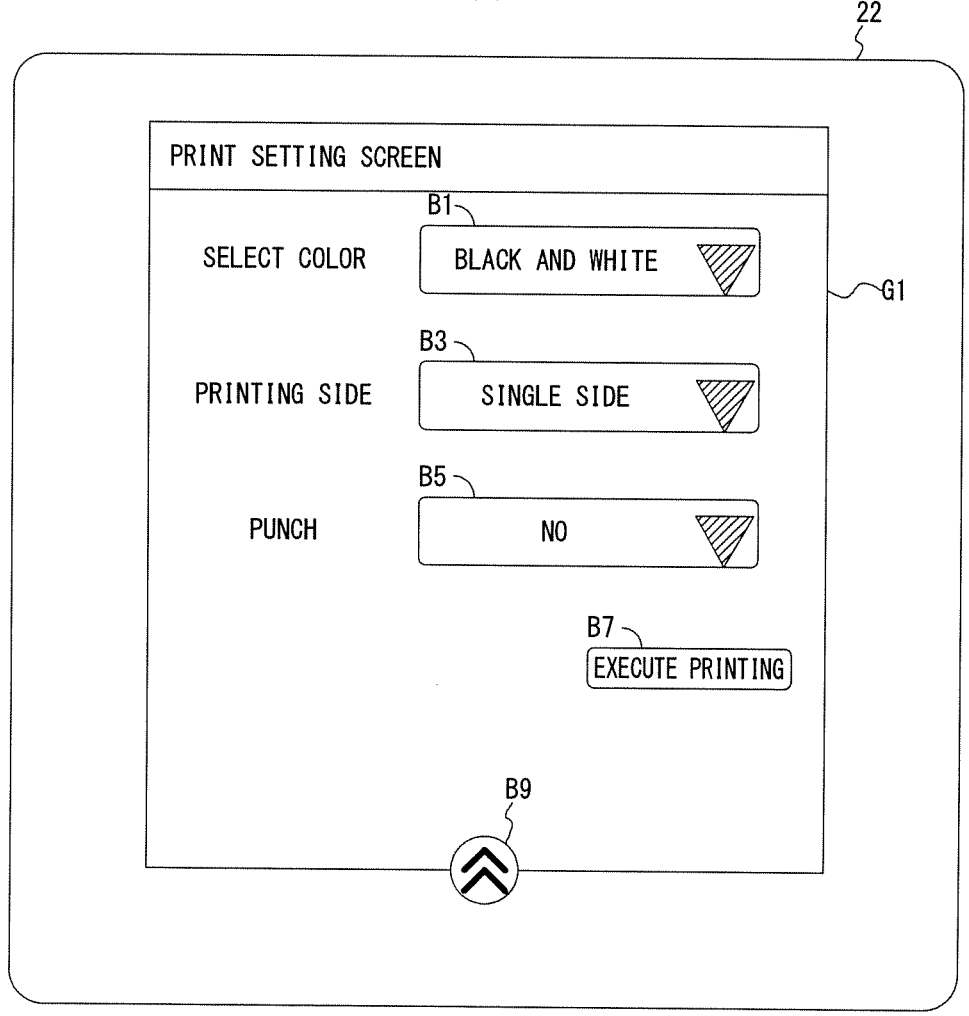
FIGS. 7(A) and 7(B) each show an example of a setting screen for the first image processing apparatus.
Figure 7B:
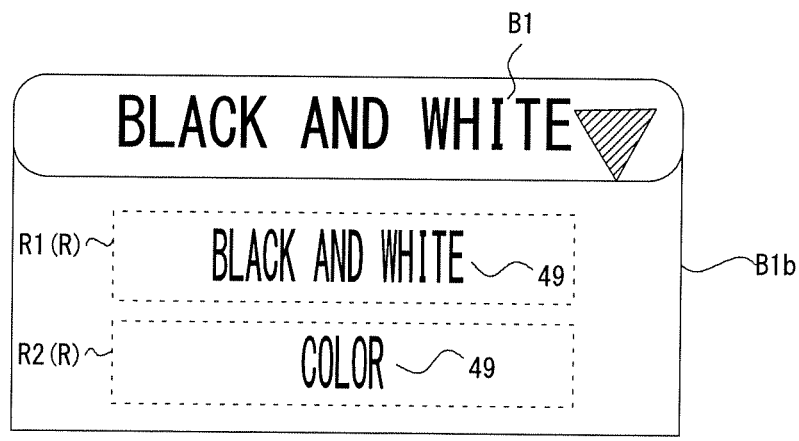

FIGS. 7(A) and 7(B) each show an example of the configuration of a setting screen displayed on the display part 22 based on setting screen information acquired from the first image processing apparatus 2. FIG. 7(A) shows an example of an initial display of a print setting screen for the first image processing apparatus 2. If the information processing apparatus 4 is brought to a state of connection to the first image processing apparatus 2, setting screen information is transmitted from the first image processing apparatus 2 to the information processing apparatus 4. In the example of FIG. 7(A), print setting screen information to be used for displaying a print setting screen is transmitted from the first image processing apparatus 2 to the information processing apparatus 4. If the information processing apparatus 4 receives the print setting screen information, the information processing apparatus 4 displays the print setting screen G1 on the display part 22. The print setting screen G1 includes a color selection button B1 for making a color setting, a printing side selection button B3 for setting a printing side, a punch selection button B5 for making a setting to form a hole in a predetermined place of a printing sheet, and an execution button B7 for executing printing based on each setting. If the print setting screen information received from the first image processing apparatus 2 is image information to be used for displaying a print setting screen, for example, the print setting screen G1 is generated as a bitmap image based on the received print setting screen information.

If connection to the first image processing apparatus 2 is established, the information processing apparatus 4 acquires print setting screen information to be used for displaying an initial print setting screen on the display part 22 from the first image processing apparatus 2. Further, the information processing apparatus 4 acquires a command from the first image processing apparatus 2 defined in connection with each of the color selection button B1, the printing side selection button B3, and the punch selection button B5. The print setting screen information acquired from the first image processing apparatus 2 includes a program to be executed by detection of operation on each of the color selection button B1, the printing side selection button B3, and the punch selection button B5. For example, this program is started by detection of operation on a corresponding button. Then, the display controller 34 displays a pull-down image B1b at a position near this button such as one below the button.

FIG. 7(B) shows an example of the pull-down image B1b displayed in response to operation on the color selection button B1. If operation on the color selection button B1 is detected, the pull-down image B1b is displayed below and adjacent to the color selection button B1. The pull-down image B1b has a setting display 49 indicating a set value selectable for a color setting. The pull-down image B1b includes an operation acceptance region R formed of a certain region with a corresponding setting display 49. If operation performed in the operation acceptance region R is detected, a command defined in connection with the color selection button B1 is converted to a command associated in advance with operation in this operation acceptance region R. In the example of FIG. 7(B), the pull-down image B1b includes an operation acceptance region R1 (R) with a setting display 49 indicating "BLACK AND WHITE," and an operation acceptance region R2 (R) with a setting display 49 indicating "COLOR." The command "gray" is associated with operation in the operation acceptance region R1 (R). If operation in the operation acceptance region R1 (R) is detected, the command defined in connection with the color selection button B1 is converted to "gray."

Each operation acceptance region R in the pull-down image B1b and a display of the color selection button B1 are associated in advance. If operation in the operation acceptance region R1 (R) is detected, for example, the display controller 34 displays "BLACK AND WHITE" in the color selection button B1, which is the same display as the setting display 49. The command "color" is associated with operation in the operation acceptance region R2 (R). If operation in the operation acceptance region R2 (R) is detected, the command defined in connection with the color selection button B1 is converted to "color" associated in advance with operation in the operation acceptance region R2 (R). Then, the display controller 34 displays "COLOR" in the color selection button B1, which is the same display as the setting display 49 in the operation acceptance region R2. If the execution button B7 is operated thereafter, the information processing apparatus 4 extracts a command defined in connection with a corresponding button from the first command set 6, generates a job, and transmits the extracted command and the job together to the first image processing apparatus 2.

Figure 8:
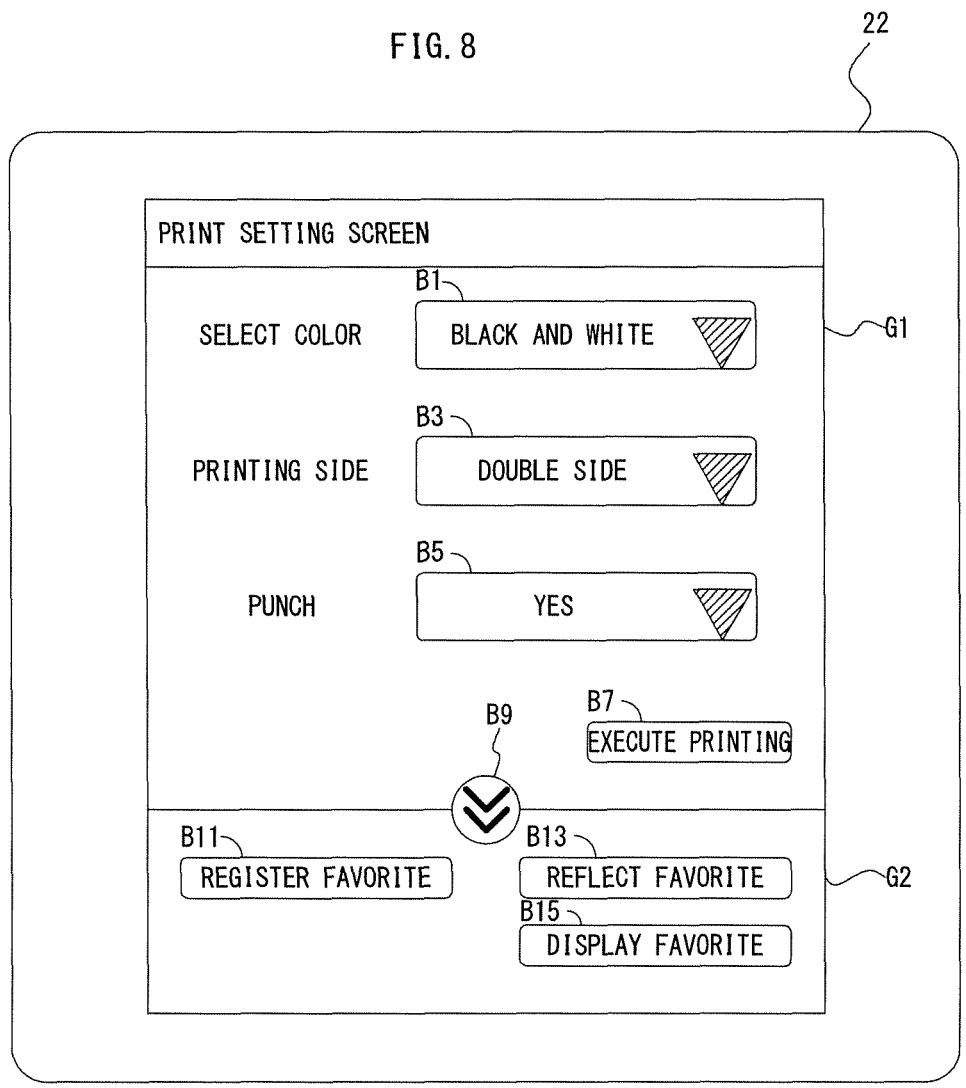
FIG. 8 shows an example of a setting screen and an example of a favorite registration screen for the first image processing apparatus.

If the operation detecting part 32 detects operation by a user, the display controller 34 generates a screen for registration of a favorite. A display switch button B9 is displayed below the print setting screen G1 of FIG. 7(A). If operation by the user to select the display switch button B9 and slide the button B9 upward is detected, for example, the display controller 34 displays a favorite registration screen G2 for registration of a favorite on the display part 22. FIG. 8 shows an example of the configuration of the favorite registration screen G2. If operation on the display switch button B9 by the user is detected, the display controller 34 displays the favorite registration screen G2 below and adjacent to the print setting screen G1. The favorite registration screen G2 includes a registration button B11 for registration of a favorite, a reflection button B13 for reflection of a registered favorite in a print setting, and a display button B15 for display of the content of a registered favorite. If operation on the registration button B11 is detected, the information processing apparatus 4 extracts a command defined in connection with a corresponding button in the print setting screen G1 from the first command set 6. In the example of FIG. 8, the information processing apparatus 4 extracts the command defined in connection with each of the color selection button B1, the printing side selection button B3, and the punch selection button B5. Then, the information processing apparatus 4 registers the extracted command with the command registration information 10 and stores the command registration information 10 into the storage 28. If operation on the reflection button B13 is detected, the information processing apparatus 4 reads the command registration information 10 and determines whether or not a command in the first command set 6 acquired by the command set acquiring part 31 and a command in the command registration information 10 match each other. If the command in the first command set 6 and the command in the command registration information 10 match each other, this command is extracted from the first command set 6 and reflected in the print setting screen G1. Action to be taken in response to operation on the reflection button B13 will be described later. If operation on the display button B15 is detected, the information processing apparatus 4 reads the command registration information 10 and displays each command in the command registration information 10 on the display part 22. Action to be taken in response to operation on the display button B15 will be described later.

Figure 9:
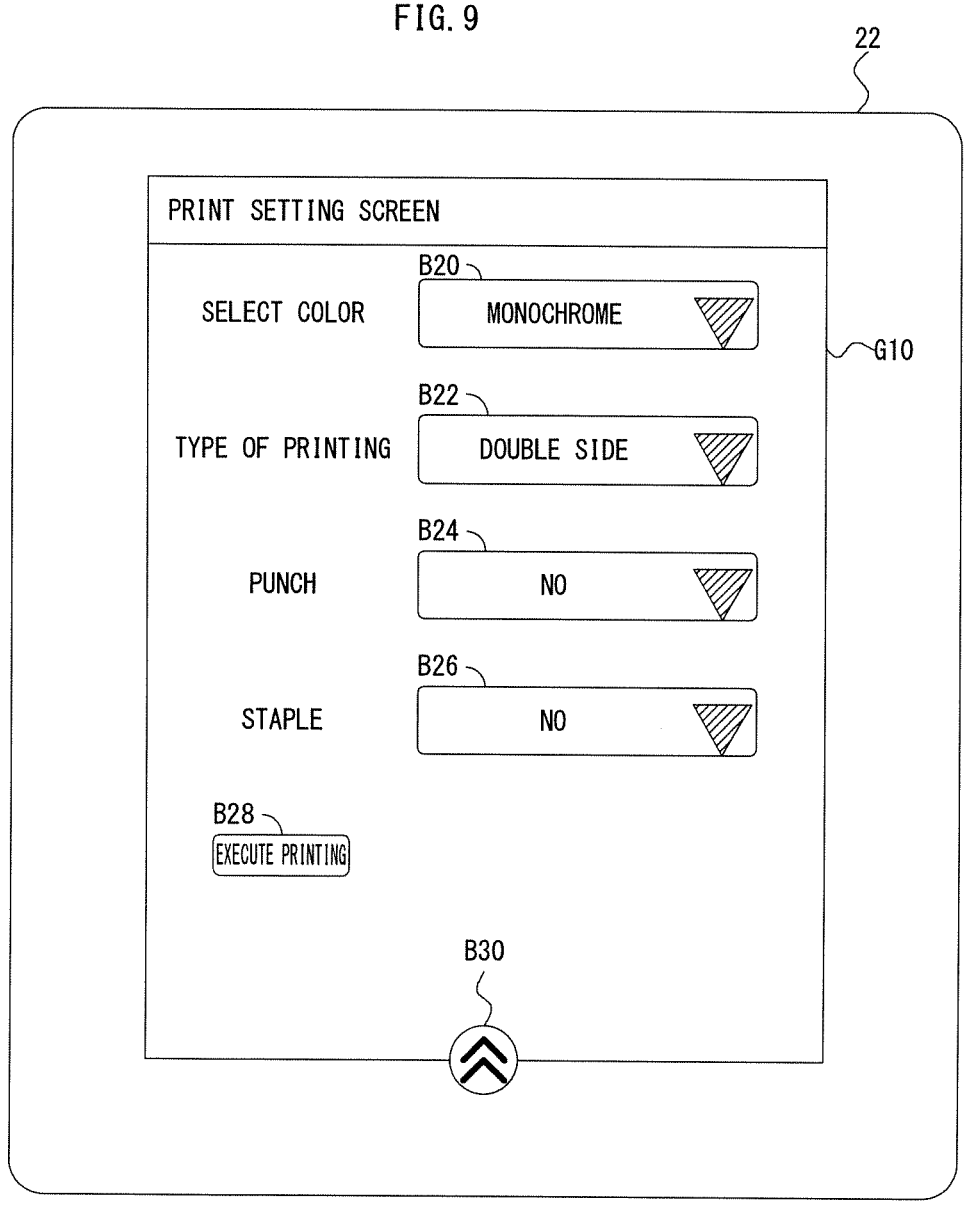
FIG. 9 shows an example of a setting screen for the second image processing apparatus.

FIG. 9 shows an example of the configuration of a setting screen displayed on the display part 22 based on setting screen information acquired from the second image processing apparatus 3. If connection to the second image processing apparatus 3 is established, the information processing apparatus 4 transmits a request for setting screen information to the second image processing apparatus 3. If setting screen information is received from the second image processing apparatus 3, the display controller 34 displays a setting screen on the display part 22 based on the received setting screen information. If print setting screen information for making a print setting is acquired from the second image processing apparatus 3, for example, the display controller 34 displays the print setting screen G10 on the display part 22 based on the acquired print setting screen information. As described above in relation to the first image processing apparatus 2, the print setting screen information is image data to be used for displaying a bitmap image, for example. In the example of FIG. 9, the print setting screen G10 includes a color selection button B20 for selecting a color setting, a printing side selection button B22 for setting a printing side, a punch selection button B24 for making a setting to form a hole in a predetermined place of a printing sheet, a staple selection button B26 for making a setting to staple printing sheets at a predetermined place, and an execution button B28 for executing printing based on a command defined in connection with a corresponding one of these buttons. A display switch button B30 for display of a favorite registration screen for registration of a favorite is displayed below the print setting screen G10.

The print setting screen information acquired from the second image processing apparatus 3 includes a program to be executed by detection of operation on each of the color selection button B20, the printing side selection button B22, the punch selection button B24, and the staple selection button B26. If operation on any of these buttons is detected, a pull-down image is displayed at a position such as one below the operated button. Like in the case of the first image processing apparatus 2, an operation acceptance region is provided in the pull-down image. If operation in the operation acceptance region is detected, a command associated in advance with operation in this operation acceptance region is defined in connection with the operated button.

Referring back to FIG. 6, the command extracting part 36 is a processor that extracts at least a selected command from a plurality of commands in the first command set 6 or the second command set 7 based on setting operation by a user while the display controller 34 displays a setting screen on the display part 22. If the operation detecting part 32 detects operation on the execution button B7 while the print setting screen G1 of FIG. 7(A) for making a print setting for the first image processing apparatus 2 is displayed, for example, the command extracting part 36 extracts a command defined in connection with each of the color selection button B1, the printing side selection button B3, and the punch selection button B5 from the first command set 6.

If the operation detecting part 32 detects operation on the execution button B28 while the print setting screen G10 of FIG. 9 for making a print setting for the second image processing apparatus 3 is displayed, the command extracting part 36 extracts a command defined in connection with each of the color selection button B20, the printing side selection button B22, the punch selection button B24, and the staple selection button B26 from the second command set 7. After the command extracting part 36 extracts the command, the job generating part 38 becomes functional.

The job generating part 38 is a processor that generates a job for the first image processing apparatus 2 or the second image processing apparatus 3. The job generating part 38 includes a command transmitting part 39. The command transmitting part 39 is a processor that transmits a command extracted by the command extracting part 36 to the first image processing apparatus 2 or the second image processing apparatus 3. In the example of FIGS. 7(A) and 7(B), the job generating part 38 generates a print job for the first image processing apparatus 2. Then, the command transmitting part 39 transmits the generated print job and the extracted command together to the first image processing apparatus 2.

The command registering part 40 is a processor that registers a command extracted by the command extracting part 36 with the command registration information 10. If the operation detecting part 32 detects operation on the registration button B11 while the favorite registration screen G2 of FIG. 8 is displayed, the command extracting part 36 extracts a command defined in connection with each of the color selection button B1, the printing side selection button B3, and the punch selection button B5 displayed in the print setting screen G1 from the first command set 6 acquired by the command set acquiring part 31. In the example of FIG. 8, the command "gray" for setting black and white printing is defined in connection with the color selection button B1 with a display content "BLACK AND WHITE." Further, the command "side_both" for setting double-side printing is defined in connection with the printing side selection button B3 with a display "DOUBLE SIDE," and the command "punch_two" for making a setting to form a hole in a predetermined place of a printing sheet is defined in connection with the punch selection button B5 with a display "YES." If a user operates the favorite registration button B11 in this state, the command extracting part 36 extracts the command defined in connection with each of the aforementioned buttons from the first command set 6 and registers the extracted command with the command registration information 10.

The command registering part 40 adds a keyword to a command extracted by the command extracting part 36. The keyword is associated with the extracted command in the command table 12 (see FIG. 3). Then, the command registering part 40 registers the command and the keyword with the command registration information 10. FIG. 10 shows an example of the configuration of the command registration information 10. The command registration information 10 includes a registered command 10*a* and a keyword 10*b* associated with each registered command 10*a*. If the command extracting part 36 extracts a command, the command registering part 40 reads the command table 12 from the storage 28 and extracts a keyword associated with each extracted command. Then, the command registering part 40 adds the extracted keyword to each associated command, and registers the command and the keyword with the command registration information 10. To reflect a setting registered as a favorite in connection with the first image processing apparatus 2 in the second image processing apparatus 3, the information processing apparatus 4 compares a keyword added to a command in the second command set 7 and the keyword 10*b*. If these keywords match each other, the information processing apparatus 4 extracts the command associated with this keyword from the second command set 7 and reflects the extracted command in the print setting screen G10 (see FIG. 9). By the presence of the registered command 10*a* and the keyword 10*b* in the command registration information 10 and by comparison between keywords, a favorite registered in connection with the first image processing apparatus 2 can be reflected efficiently in a print setting for the second image processing apparatus 3.

If the command extracting part 36 extracts a command based on setting operation by a user in the presence of the registered command registration information 10, the command registering part 40 may update the command registration information 10 based on the extracted command. If the operation detecting part 32 detects operation on the favorite registration button B11 (see FIG. 8) while the command registration information 10 of FIG. 10 is stored in the storage 28, for example, the command extracting part 36 extracts a command associated in advance with a set value about a display content in each of the color selection button B1, the printing side selection button B3, and the punch selection button B5 displayed in the print setting screen G1 at the time of the operation on the favorite registration button B11. The command registering part 40 updates the command registration information 10 based on the extracted command. By doing so, the command registration information can be updated in a manner that depends on an intended setting by the user.

Unlike the aforementioned processing, if the command extracting part 36 extracts a command based on setting operation by a user in the presence of the registered command registration information 10, command registration information 10 reflecting the extracted command may be generated. If the operation detecting part 32 detects operation on the favorite registration button B11 and the command extracting part 36 extracts a command in the presence of the registered command registration information 10, the command registering part 40 generates new command registration information 10 based on the command extracted by the command extracting part 36. By doing so, a plurality of settings intended by the user can be registered with the command registration information 10 and the user is allowed to properly select command registration information 10 to be reflected.

The command determining part 42 is a processor that functions as follows. If the command set acquiring part 31 acquires the first command set 6 or the second command set 7 in the presence of a command registered with the command registration information 10, the command determining part 42 determines whether or not the acquired first command set 6 or the acquired second command set 7 includes a command associated with the command registered with the command registration information 10. If operation on the reflection button B13 in the favorite registration screen G2 of FIG. 8 is detected, for example, the command determining part 42 compares a command registered with the command registration information 10 and a command in the first command set 6 acquired from the first image processing apparatus 2. In the presence of the registered command registration information 10 based on a favorite registered in connection with the first image processing apparatus 2, to reflect the favorite registered in connection with the first image processing apparatus 2 in the second image processing apparatus 3 by connecting the information processing apparatus 4 to the second image processing apparatus 3, the command determining part 42 determines whether or not the second command set 7 acquired from the second image processing apparatus 3 includes a command associated with the command in the first command set 6 registered with the command registration information 10. In this case, the command determining part 42 refers to the command table 12 stored in the storage 28 (see FIG. 3), and adds a keyword to each command in the second command set 7 acquired by the command set acquiring part 31.

FIGS. 11(A) and 11(B) show examples of the configurations of the first command set 6 and the second command set 7 respectively with added keywords acquired by the command set acquiring part 31. FIG. 11(A) shows the example of the configuration of the first command set 6 with added keywords. The first command set 6 with the added keywords includes a command 6*a* and a keyword 6*b* associated with the command 6*a*. FIG. 11(B) shows the example of the configuration of the second command set 7 with the added keywords. The second command set 7 with the added keywords includes a command 7*a* and a keyword 7*b* associated with the command 7*a*. If operation to reflect a registered favorite is performed while connection to the second image processing apparatus 3 is established, the command determining part 42 adds the keywords to the second command set 7 based on the command table 12, as shown in FIG. 11(B). Then, the command determining part 42 reads the command registration information 10 (see FIG. 10), and compares the keyword 10*b* registered with the command registration information 10 and the keyword 7*b* in the second command set 7. If the keyword 10*b* and the keyword 7*b* match each other, the command determining part 42 determines that the second command set 7 includes a command associated with a command in the command registration information 10. Such comparison between keywords makes it possible to efficiently determine whether or not the second command set 7 acquired from the second image processing apparatus 3 includes a command registered as a favorite in connection with the first image processing apparatus 2.

The display controller 34 includes a command reflecting part 46. The command reflecting part 46 is a processor that extracts a command associated with a command registered with the command registration information 10 from a plurality of commands in the first command set 6 or the second command set 7 based on a result of determination by the command determining part 42, and reflects the extracted command in a setting screen. If the command determining part 42 determines that the second command set 7 includes a command associated with a command registered with the command registration information 10, for example, the command reflecting part 46 extracts this command from the second command set 7 and reflects the extracted command in the print setting screen G10. By doing so, during generation of a print job for the second image processing apparatus 3, a command reflecting the command registration information 10 is added to the print job.

Figure 12:
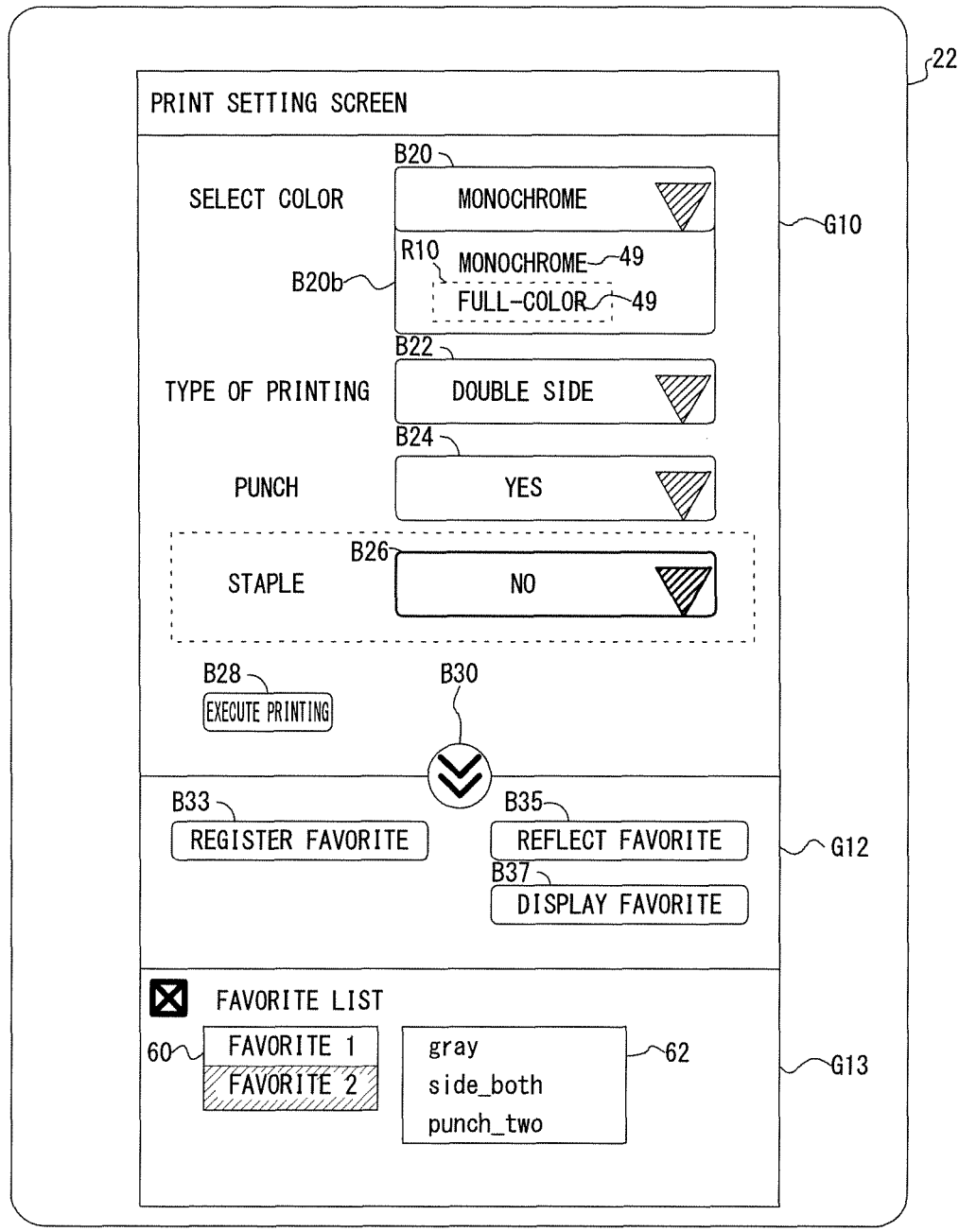
FIG. 12 shows an example of a favorite registration screen and an example of a favorite display screen for the second image processing apparatus.

FIG. 12 shows an example including the print setting screen G10 acquired from the second image processing apparatus 3 in which the command registration information 10 is reflected. A favorite registration screen G12 is displayed below and adjacent to the print setting screen G10. A favorite display screen G13 for display of a setting registered as a favorite is further displayed below the favorite registration screen G12. The favorite registration screen G12 includes a registration button B33 for registration of a favorite, a reflection button B35 for reflection of a favorite in a print setting screen, and a display button B37 for display of the favorite display screen G13 indicating the content of the command registration information 10 registered as a favorite. The favorite display screen G13 includes a title display area 60 for display of a title list of the command registration information 10 registered as a favorite, and a content display area 62 for display of the content of the command registration information 10 with a title selected in the title display area 60.

In the example of FIG. 12, the command registration information 10 registered with a title FAVORITE 1 is selected. The displayed content of this command registration information 10 includes the command "gray" for setting color at black and white, the command "side_both" for setting a printing side at double sides, and the command "punch_two" for making a setting to form a hole in a predetermined place of a printing sheet. In response to operation by a user on the reflection button B35, the command determining part 42 compares the keyword 7b (see FIG. 11(B)) of a command in the second command set 7 and the keyword 10b (see FIG. 10) registered with the command registration information 10. The command determining part 42 determines that the second command set 7 includes commands matching all the keywords 10b registered with the command registration information 10. Then, the command reflecting part 46 extracts the command "monochro," the command "side_two," and the command "punching" from the second command set 7.

The command reflecting part 46 associates each command in the second command set 7 in advance with a display style of a corresponding one of the color selection button B20, the printing side selection button B22, the punch selection button B24, and the staple selection button B26. The command reflecting part 46 displays each of these buttons in a style associated with an extracted command. For example, the command "monochro" is associated in advance with a display "MONOCHROME" of the color selection button B20. The command "side_two" is associated in advance with a display "DOUBLE SIDE" of the printing side selection button B22. The command "punching" is associated in advance with a display "YES" of the punch selection button B24. In the example of FIG. 12, the command reflecting part 46 displays "MONOCHROME" in the color selection button B20, "DOUBLE SIDE" in the printing side selection button B22, and "YES" in the punch selection button B24 in a manner that depends on extracted commands associated with these buttons. This allows a user to know that a registered favorite is reflected in a display of each button in the print setting screen G1.

Figure 13:
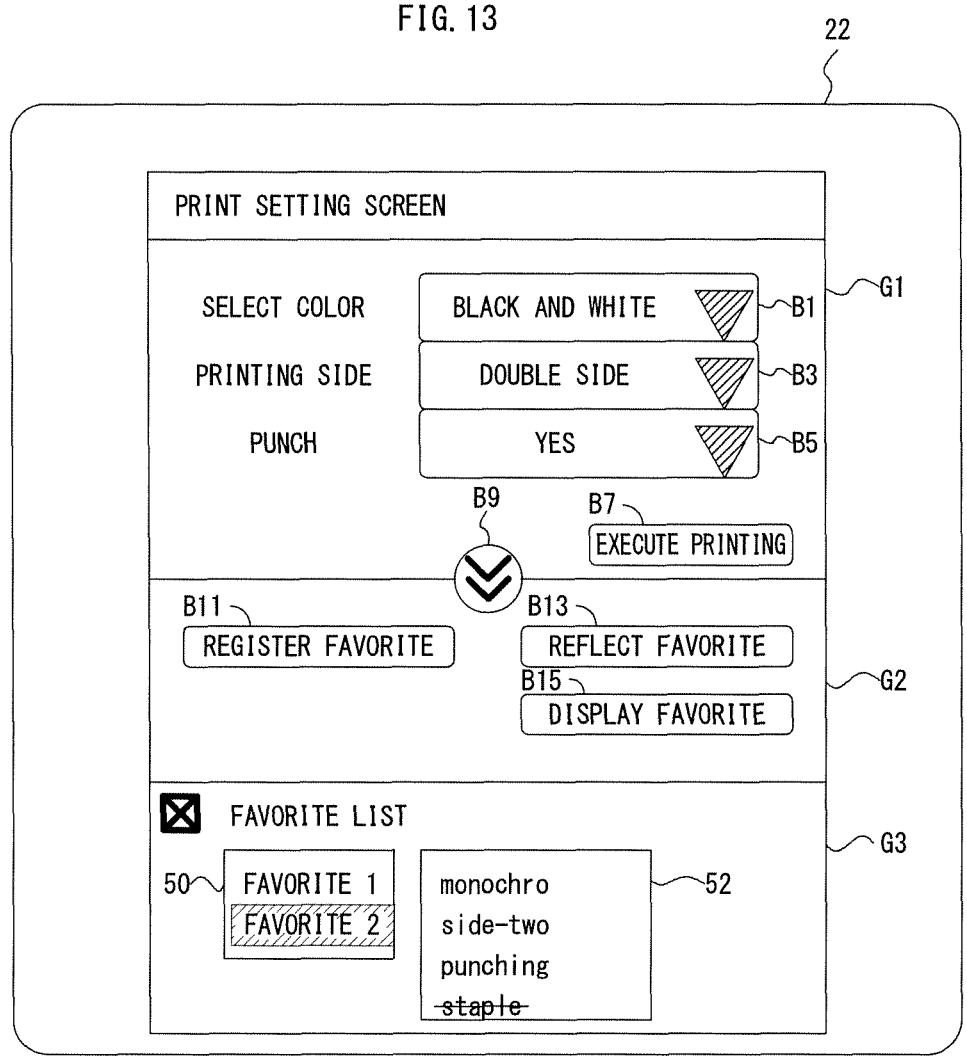
FIG. 13 shows an example of a favorite registration screen and an example of a favorite display screen for the first image processing apparatus.

If the command determining part 42 makes a determination that a command set acquired by the command set acquiring part 31 does not include a command associated with a command registered with the command registration information 10, the display controller 34 displays a result of the determination in a setting screen. FIG. 13 shows an example of a case where the first image processing apparatus 2 and the information processing apparatus 4 are connected and the print setting screen G1 for the first image processing apparatus 2 is displayed. The favorite registration screen G2 is displayed below and adjacent to the print setting screen G1. If the display button B15 is operated, a favorite display screen G3 is further displayed below the favorite registration screen G2. The favorite display screen G3 includes a title display area 50 for display of a title of the command registration information 10 registered as a favorite, and a content display area 52 for display of the content of the command registration information 10 with a title selected in the title display area 60.

The command registration information 10 registered with a title FAVORITE 1 is selected and the content of this command registration information 10 is displayed in the content display area 62, for example. This command registration information 10 includes the command "staple" for making a setting to staple printing sheets at a predetermined place. Meanwhile, the first image processing apparatus 2 does not have a stapling function, so that the first command set 6 does not include the command "staple" (see the command table 12 of FIG. 3). In the example of FIG. 13, the display controller 34 crosses out the command "staple" displayed in the content display area 62. This allows a user to know that the command "staple" in FAVORITE 1 is not reflected in a print setting for the first image processing apparatus 2.

Referring back to FIG. 6, the difference extracting part 44 is a processor that extracts a difference between a command registered with the command registration information 10 and a command in the first command set 6 or the second command set 7 acquired by the command set acquiring part 31. If the command determining part 42 determines that a command associated with a command in a command set acquired by the command set acquiring part 13 is not registered with the command registration information 10, the difference extracting part 44 extracts the command as a difference from the first command set 6 or the second command set 7. After the difference extracting part 44 extracts the command, the display controller 34 highlights an image in a print setting screen corresponding to the extracted command.

As shown in FIG. 12, in a case where the information processing apparatus 4 is connected to the second image processing apparatus 3 and the print setting screen G10 is displayed on the display part 22, for example, the command registration information 10 registered as FAVORITE 1 does not include the command "staple" for stapling. Meanwhile, stapling is permitted in the second image processing apparatus 3, so that the second command set 7 includes the command "staple" (see FIG. 11(B)). If the difference extracting part 44 extracts the command "staple" as a difference from the second command set 7, the display controller 34 highlights the staple selection button B26 associated with the command "staple." If a pull-down image B20b is displayed below the color selection button B20 in response to operation to select the color selection button B20, a setting display 49 indicating "MONOCHROME" and a setting display 49 indicating "FULL-COLOR" are displayed in the pull-down imager B20b. Then, the command determining part 42 makes a determination and, as a result of the determination, the difference extracting part 44 extracts the command "fullcolor" not included in the command registration information 10. After the difference extracting part 44 extracts the command "fullcolor," the display controller 34 highlights a setting display 49 in an operation acceptance region R10 associated in advance with the extracted command. In this way, the information processing apparatus 4 is allowed to let a user know that a setting different from the content of a registered favorite is selectable.

Unlike the aforementioned processing, a target of highlighting may not be a display corresponding to every difference between a command in a command set acquired by the command set acquiring part 31 and a command in the command registration information 10. Only if the first image processing apparatus 2 or the second image processing apparatus 3 does not have a function not included in a registered favorite, a display corresponding to this function may be highlighted. In the example of FIG. 12, a registered favorite does not have a stapling function, whereas the second image processing apparatus 3 has a stapling function. In this case, a display in the print setting screen G10 corresponding to a stapling function may be highlighted. For example, in the command table 12, a command may be associated with a keyword for each function. A command may further be associated with a keyword for each setting of each function. The difference extracting part 44 may extract only a difference in terms of a keyword for each function and then the extracted difference may be highlighted.

Figure 14:
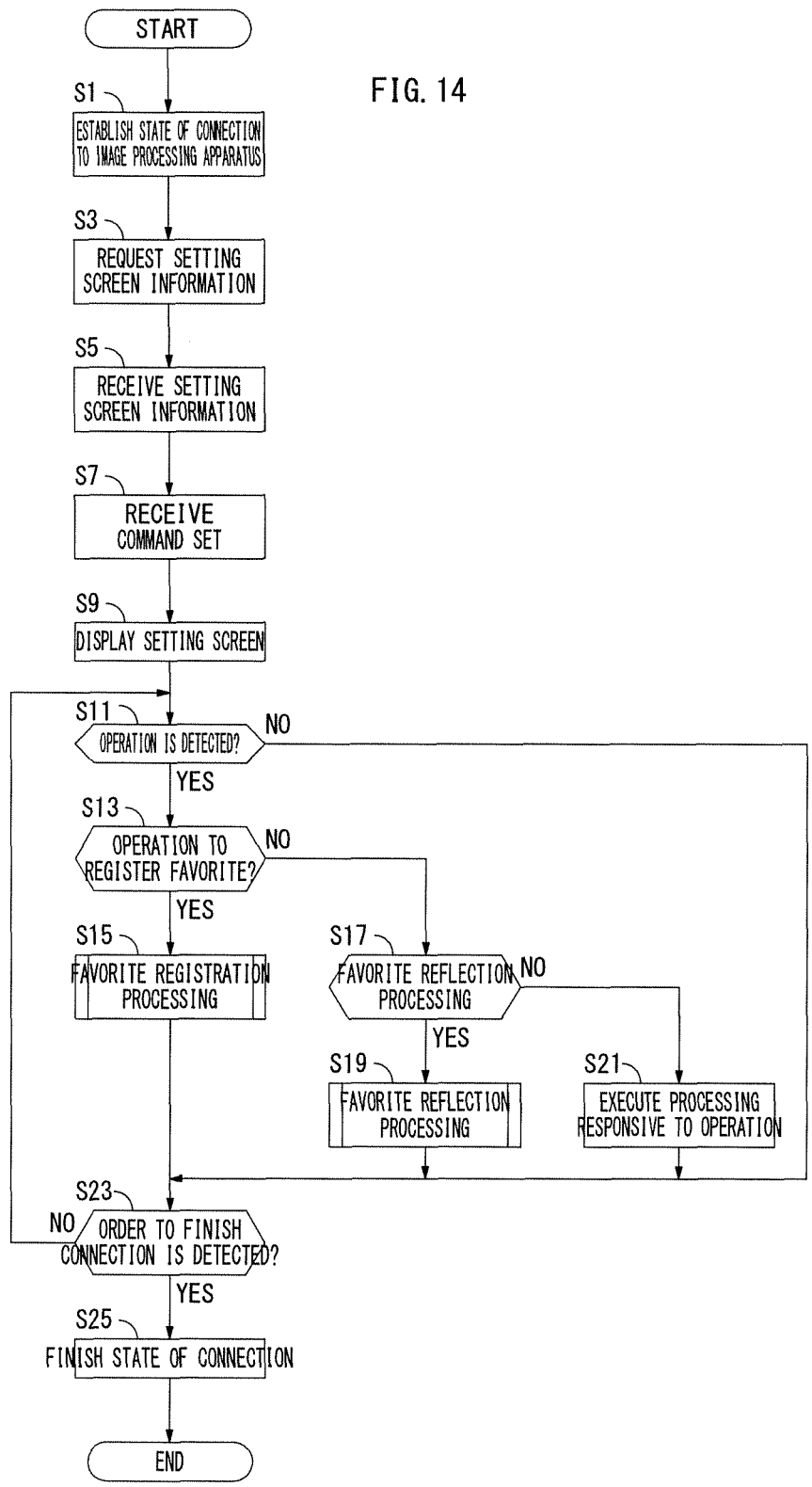
FIG. 14 is a flowchart showing an example of a procedure taken by the information processing apparatus.

A procedure taken by the information processing apparatus 4 will be described next. FIG. 14 is a flowchart showing an example of a main procedure taken by the information processing apparatus 4. If a state of connection to the first image processing apparatus 2 or the second image processing apparatus 3 is established (step S1), the information processing apparatus 4 transmits a request for setting screen information to the first image processing apparatus 2 or the second image processing apparatus 3 to which the information processing apparatus 4 is connected (step S3). Then, the information processing apparatus 4 receives setting screen information from the first image processing apparatus 2 or the second image processing apparatus 3 (step S5). Further, the information processing apparatus 4 receives the first command set 6 or the second command set 7 from the first image processing apparatus 2 or the second image processing apparatus 3 (step S7). Next, the information processing apparatus 4 displays a setting screen on the display part 22 based on the received setting screen information (step S9).

While the setting screen is displayed, the information processing apparatus 4 determines whether or not operation by a user is detected (step S11). If operation is detected (YES of step S11), the information processing apparatus 4 further determines whether or not the detected operation is to register a favorite (step S13). If the detected operation is to register a favorite (YES of step S13), the information processing apparatus 4 executes favorite registration processing of registering the command registration information 10 by registering a favorite (step S15). A specific procedure of the favorite registration processing (step S15) will be described later. If the detected operation is not to register a favorite (NO of step S13), the information processing apparatus 4 further determines whether or not the detected operation is to reflect a registered favorite in an output setting (step S17). If the detected operation is to reflect a registered favorite in an output setting (YES of step S17), the information processing apparatus 4 executes favorite reflection processing of reflecting a registered favorite in an output setting (step S19). A specific procedure of the favorite reflection processing (step S19) will be described later. Meanwhile, if the detected operation is not to reflect a registered favorite in an output setting (NO of step S17), the information processing apparatus 4 executes processing responsive on the detected operation (step S21).

Next, the information processing apparatus 4 determines whether or not operation to order finish of the state of connection to the first image processing apparatus 2 or the second image processing apparatus 3 is detected (step S23). If operation to order finish of the state of connection is not detected (NO of step S23), the information processing apparatus 4 returns to step S11 and executes the processing from step S11 to step S21 repeatedly until operation to order finish of the state of connection is detected. If operation by the user is not detected in step S11 (NO of step S11), the information processing apparatus 4 skips the processing from step S13 to S21.

Finally, if operation to order finish of the connection is detected (YES of step S23), the information processing apparatus 4 finishes the state of connection to the first image processing apparatus 2 or the second image processing apparatus 3 to which the information processing apparatus 4 has been connected. Then, the information processing apparatus 4 completes the processing (step S25).

Figure 15:
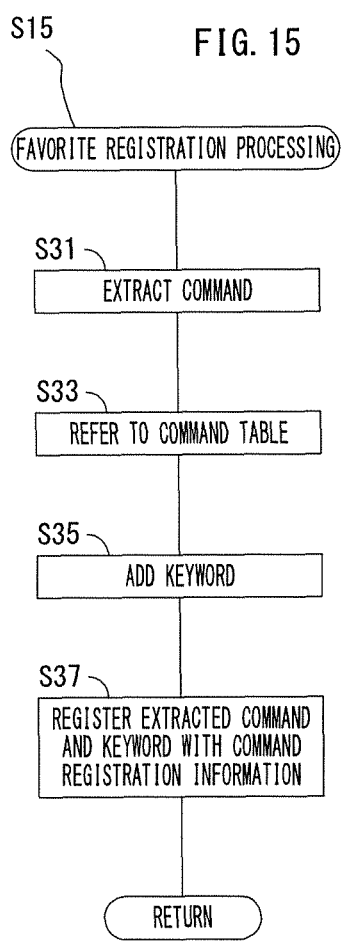
FIG. 15 is a flowchart showing an example of a specific procedure of favorite registration processing.

FIG. 15 is a flowchart showing an example of the specific procedure of the favorite registration processing (step S15 of FIG. 14). The information processing apparatus 4 extracts a command selected by the user as a favorite to be registered (step S31). Next, the information processing apparatus 4 refers to the command table 12 (step S33), adds a keyword to the extracted command (step S35), and registers the extracted command and the keyword added to the extracted command with the command registration information 19 (step S37). Then, the information processing apparatus 4 finishes the favorite registration processing.

Figure 16:
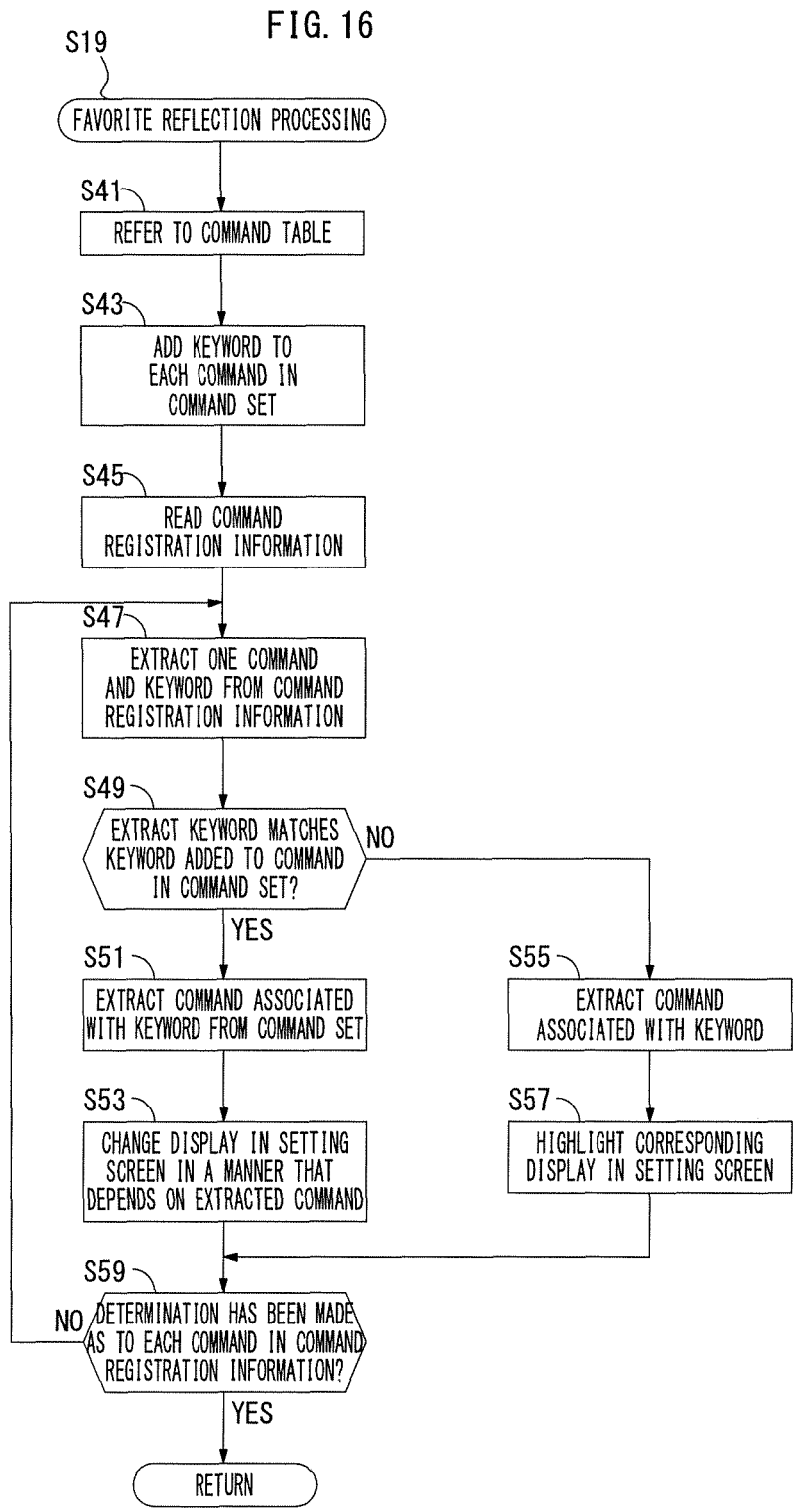
FIG. 16 is a flowchart showing an example of a specific procedure of favorite reflection processing.

FIG. 16 is a flowchart showing an example of the specific procedure of the favorite reflection processing (step S19 of FIG. 14). The information processing apparatus 4 refers to the command table 12 (step S41), and adds a keyword to each command in the first command set 6 or the second command set 7 acquired from the first image processing apparatus 2 or the second image processing apparatus 3 to which the information processing apparatus 4 is connected (step S43). Then, the information processing apparatus 4 reads the command registration information 10 from the storage 28 (step S45).

Next, the information processing apparatus 4 extracts one registered command 10a and the keyword 10b associated with this registered command 10a (step S47), and determines whether or not the extracted keyword 10b matches the keyword added to the command in the first command set 6 or the second command set 7 (step S49). If the keyword 10b in the command registration information 10 matches the keyword added to the command in the first command set 6 or the second command set 7 (YES of step S49), the information processing apparatus 4 extracts the command associated with the matching keyword from the first command set 6 or the second command set 7 (step S51). Then, the information processing apparatus 4 changes a display of the setting screen displayed on the display part 22 in a manner that depends on the extracted command, thereby reflecting the registered favorite in an output setting (step S53).

Meanwhile, if there is no command with a keyword matching the keyword 10b (No of step S49), the information processing apparatus 4 extracts a command associated with this keyword 10b from the command registration information 10 (step S55), and highlights a display corresponding to the extracted command in the setting screen (step S57). Highlighting of the extracted command is not limited to a display in the setting screen but a display of this extracted command in a favorite registration screen or in a favorite display screen may also be highlighted.

Finally, the information processing apparatus 4 determines whether or not a determination has been made as to match between the keyword 10b associated with each registered command 10a registered with the command registration information 10 and the keyword added to the command in the first command set 6 or the second command set 7 (step S59). If this determination has been made about the keyword 10b associated with each registered command 10a (YES of step S59), the information processing apparatus 4 finishes the favorite reflection processing. Meanwhile, if this determination has not been made about the keyword 10b associated with each registered command 10a (NO of step S59), the information processing apparatus 4 returns to step S47 to extract one registered command 10a and the keyword 10b associated with this registered command 10a from the command registration information 10. Then, the information processing apparatus 4 executes steps S47 to S57. The information processing apparatus 4 executes steps S47 to S57 repeatedly until the aforementioned determination about the keyword 10b associated with each registered command 10a is finished.

The present invention is not to be limited to the substance of the above-described embodiments but various modifications are applicable to the present disclosure.

Figure 17:
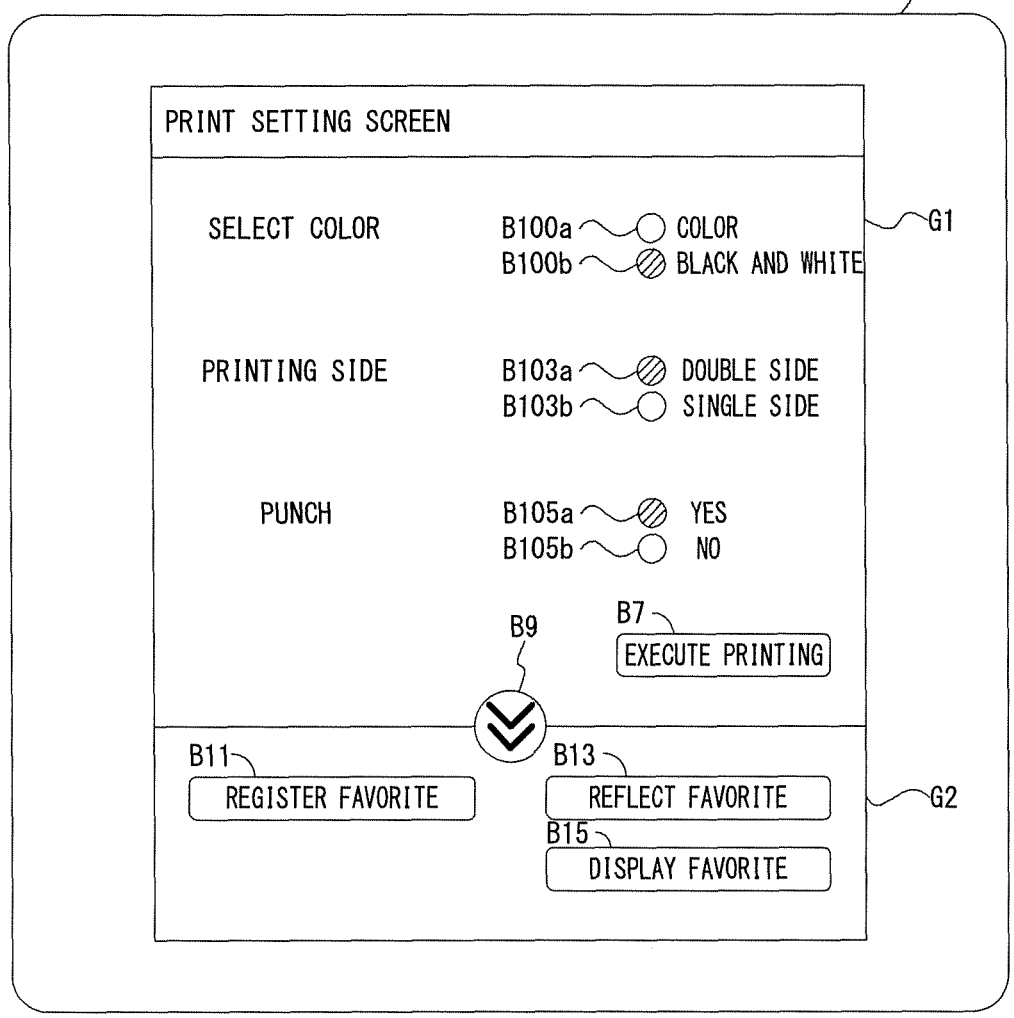
FIG. 17 shows an example of the configuration of a print setting screen according to a modification.

For example, in the above-described embodiments, the pull-down image B1b is displayed in response to operation by a user on each button in the print setting screen G1. However, this is not to limit the present invention. The print setting screen G1 may include a button image indicating a setting item selectable by the user as a display content associated with each setting command. Further, a setting command may be associated with each setting item and a display style of a selected setting item may be changed in response to operation by the user. A setting command associated with each setting item may be extracted in a manner that depends on change in a display style of each setting item. As shown in FIG. 17, the print setting screen G1 includes all setting items in the form of radio buttons, etc. selectable by the user. These radio buttons include a color selection button B100a and a black and white selection button B110b about a color setting, a double-side selection button B103a and a single-side selection button B103b about a printing side setting, and a punch selection button 105a and a non-punch selection button B105b about a punching setting. A setting command is associated with a set value about each of these buttons. If the print setting screen G1 is displayed while the black and white selection button B110b is selected, a setting command for executing black and white printing is extracted.

In the above-described embodiments, the information processing apparatus 4 stores the command table 12 into the storage 28 in advance. However, this is not to limit the present invention. The command table 12 may be acquired from the first image processing apparatus 2 or the second image processing apparatus 3 together with the first command set 6 or the second command set 7. Alternatively, if appropriate, the command table 12 may be acquired from an external device such as a print server.

In the above-described embodiments, the command table 12 includes the keyword 12b. Alternatively, the command table 12 may not include the keyword 12b but may function to associate a command for the first image processing apparatus 2 and a command for the second image processing apparatus 3.

In the above-described embodiments, the information processing apparatus 4 makes a print setting for the first image processing apparatus 2 or the second image processing apparatus 3. However, a setting to be made by the information processing apparatus 4 is not limited to a print setting but it also includes a setting for scan processing and a setting for transmitting and receiving processing by facsimile.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing apparatus comprising:
a communication interface that communicates with at least one of a first image processing apparatus to execute a first job set based on a first command set and a second image processing apparatus to execute a second job set based on a second command set different from the first command set;
a processor that:
   acquires, while the communication interface communicates with the first image processing apparatus, the first command set from the first image processing apparatus through the communication interface, and
   acquires, while the communication interface communicates with the second image processing apparatus, the second command set from the second image processing apparatus through the communication interface; and
a display controller that displays, in response to the processor acquiring the first command set or the second command set, a setting screen in which a user is allowed to set at least one of a plurality of setting commands in the first command set or the second command set,
wherein the processor further:
   extracts at least one setting command from the setting commands in the first command set or the second command set based on setting operation by the user while the display controller displays the setting screen,
   transmits the setting command extracted by the processor to the first image processing apparatus or the second image processing apparatus,
   registers the setting command extracted by the processor with command registration information,
   determines, if a setting command in the first command set is registered with the command registration information and the processor acquires the second command set, whether the second command set includes a setting command associated with the setting command in the first command set registered with the command registration information, and
   extracts a setting command associated with the setting command in the first command set registered with the command registration information from the setting commands in the second command set based on a result of the determination by the processor, and reflects the extracted setting command in the setting screen.

2. The information processing apparatus according to claim 1, further comprising a memory in conjunction with the processor that acquires a command table in which a setting command in the first command set and a setting command in the second command set are associated with each other, wherein
the processor determines whether or not the second command set includes a setting command associated with the setting command in the first command set registered with the command registration information based on the command table acquired by the the memory.

3. The information processing apparatus according to claim 2, wherein
in the command table, a setting command in the first command set and a setting command in the second command set associated with each other are both associated with a keyword,
the processor adds a keyword to the setting command extracted by the processor and registers the setting command and the keyword with the command registration information, the keyword being associated with the extracted setting command in the command table, and
the processor compares a keyword associated in the command table with each of the setting commands in the second command set and the keyword added to the setting command registered with the command registration information, thereby determining whether or not the second command set includes a setting command associated with the setting command in the first command set registered with the command registration information.

4. The information processing apparatus according to claim 1, wherein
while the communication interface communicates with the first image processing apparatus or the second image processing apparatus, the display controller displays the setting screen based on setting screen information received from the first image processing apparatus or the second image processing apparatus.

5. The information processing apparatus according to claim 1, wherein the processor further extracts a difference of the setting command in the first command set registered with the command registration information from a setting command in the second command set acquired by the processor, and
the display controller changes a style of display in the setting screen in a manner that depends on the difference extracted by the processor.

6. The information processing apparatus according to claim 1, wherein
if the processor determines that the second command set does not include a setting command associated with the setting command in the first command set registered with the command registration information, the display controller displays a result of the determination in the setting screen.

7. The information processing apparatus according to claim 1, wherein
if the processor extracts a setting command in response to setting operation by the user in the presence of the registered command registration information, the processor updates the command registration information in a manner that depends on the extracted setting command.

8. The information processing apparatus according to claim 1, wherein if the processor extracts a setting command in response to setting operation by the user in the presence of the registered command registration information, the processor generates command registration information reflecting the extracted setting command.

9. A non-transitory recording medium storing a computer readable program to be executed by an information processing apparatus comprising a communication interface that communicates with at least one of a first image processing apparatus to execute a first job set based on a first command set and a second image processing apparatus to execute a second job set based on a second command set different from the first command set,
the program causing the information processing apparatus to function as a processor that:
acquires, while the communication interface communicates with the first image processing apparatus, the first command set from the first image processing apparatus through the communication interface, and
acquires, while the communication interface communicates with the second image processing apparatus, the second command set from the second image processing apparatus through the communication interface; and
a display controller that displays, in response to the processor acquiring the first command set or the second command set, a setting screen in which a user is allowed to set at least one of a plurality of setting commands in the first command set or the second command set, wherein
the program further causes the information processing apparatus to function as the processor that:
extracts at least one setting command from the setting commands in the first command set or the second command set based on setting operation by the user while the display controller displays the setting screen,
transmits the setting command extracted by the processor to the first image processing apparatus or the second image processing apparatus;
registers the setting command extracted by the processor with command registration information,
determines, if a setting command in the first command set is registered with the command registration information and the processor acquires the second command set, whether the second command set includes a setting command associated with the setting command in the first command set registered with the command registration information, and
extracts a setting command associated with the setting command in the first command set registered with the command registration information from the setting commands in the second command set based on a result of the determination by the processor, and reflects the extracted setting command in the setting screen.

10. The non-transitory recording medium according to claim 9, wherein
the information processing apparatus comprises a memory, in conjunction with the processor, that acquires a command table in which a setting command in the first command set and a setting command in the second command set are associated with each other, and
the processor determines whether or not the second command set includes a setting command associated with the setting command in the first command set registered with the command registration information based on the command table acquired by the memory.

11. The non-transitory recording medium according to claim 10, wherein
in the command table, a setting command in the first command set and a setting command in the second command set associated with each other are both associated with a keyword,
the processor adds a keyword to the setting command extracted by the processor and registers the setting command and the keyword with the command registration information, the keyword being associated with the extracted setting command in the command table, and
the processor compares a keyword associated in the command table with each of the setting commands in the second command set and the keyword added to the setting command registered with the command registration information, thereby determining whether or not the second command set includes a setting command associated with the setting command in the first command set registered with the command registration information.

12. The non-transitory recording medium according to claim 9, wherein
while the communicates with the first image processing apparatus or the second image processing apparatus, the display controller displays the setting screen based on setting screen information received from the first image processing apparatus or the second image processing apparatus.

13. The non-transitory recording medium according to claim 9, wherein
the program causes the information processing apparatus to further function as the processor that extracts a difference of the setting command in the first command set registered with the command registration information from a setting command in the second command set acquired by the processor, and
the display controller changes a style of display in the setting screen in a manner that depends on the difference extracted by the processor.

14. The non-transitory recording medium according to claim 9, wherein
if the processor determines that the second command set does not include a setting command associated with the setting command in the first command set registered with the command registration information, the display controller displays a result of the determination in the setting screen.

15. The non-transitory recording medium according to claim 9, wherein
if the processor extracts a setting command in response to setting operation by the user in the presence of the registered command registration information, the processor updates the command registration information in a manner that depends on the extracted setting command.

16. The non-transitory recording medium according to claim 9, wherein
if the processor extracts a setting command in response to setting operation by the user in the presence of the registered command registration information, the processor generates command registration information reflecting the extracted setting command.

* * * * *